US006763327B1

(12) United States Patent
Songer et al.

(10) Patent No.: US 6,763,327 B1
(45) Date of Patent: Jul. 13, 2004

(54) ABSTRACTION OF CONFIGURABLE PROCESSOR FUNCTIONALITY FOR OPERATING SYSTEMS PORTABILITY

(75) Inventors: Christopher Mark Songer, Mountain View, CA (US); Pavlos Konas, Mountain View, CA (US); Marc E. Gauthier, Sunnyvale, CA (US); Kevin C. Chea, San Francisco, CA (US)

(73) Assignee: Tensilica, Inc., Santa Clara, CA (US)

( * ) Notice: Subject to any disclaimer, the term of this patent is extended or adjusted under 35 U.S.C. 154(b) by 0 days.

(21) Appl. No.: 09/506,433

(22) Filed: Feb. 17, 2000

(51) Int. Cl.$^7$ .......................... G06F 17/50; G06F 9/455

(52) U.S. Cl. .......................... 703/21; 703/23; 703/20; 703/22; 703/27; 717/107; 717/138; 717/151; 717/163; 709/1; 709/324; 709/319; 709/321; 709/328; 709/310; 716/1; 716/18; 716/2; 716/17

(58) Field of Search .................. 703/21, 15, 20, 703/22, 23, 24, 26, 27; 710/23; 717/138, 134, 135, 147, 120, 106, 107; 709/1, 108, 107, 328, 321, 319, 324, 327, 329; 716/1, 4, 18, 2, 3, 17

(56) References Cited

U.S. PATENT DOCUMENTS

| | | | |
|---|---|---|---|
| 5,361,373 A | 11/1994 | Gilson | 395/800 |
| 5,544,067 A | 8/1996 | Rostoker et al. | 364/489 |
| 5,555,201 A | 9/1996 | Dangelo et al. | 364/489 |
| 5,572,437 A | 11/1996 | Rostoker et al. | 364/489 |
| 5,613,098 A * | 3/1997 | Landau et al. | 703/20 |
| 5,623,418 A | 4/1997 | Rostoker et al. | 364/489 |
| 5,696,956 A | 12/1997 | Razdan et al. | 395/568 |
| 5,748,875 A * | 5/1998 | Tzori | 714/29 |
| 5,748,979 A * | 5/1998 | Trimberger | 712/37 |
| 5,801,958 A | 9/1998 | Dangelo et al. | 364/489 |
| 5,819,064 A | 10/1998 | Razdan et al. | 395/500 |

(List continued on next page.)

OTHER PUBLICATIONS

Gonzalez, Configurable and Extensible Processors Change System Design, Tensilica, Inc., Hot Chips 1999.*
Accelerated Technology and Tensilica Alliance Provide Comprehensive Hardware and Software Solution with Nucleus PLUS Support for the Xtensa Processor, Feb. 29, 2000, Press Release at Embedded Sytems Conference, Spring 2000.*

(List continued on next page.)

*Primary Examiner*—Todd Ingberg
*Assistant Examiner*—W. D. Thomson
(74) *Attorney, Agent, or Firm*—Pillsbury Winthrop LLP

(57) ABSTRACT

A hardware abstraction layer operates as a system architectural layer between a real-time operating system and an underlying configurable processor. The hardware abstraction layer provides an abstraction of processor-specific functionality to the operating system. In particular, it abstracts configurable processor features visible to the operating system to provide a uniform, standardized interface between the operating system and the configurable processor on which it runs. Thus, an operating system running on top of the hardware abstraction layer will work on all configurations of the processor which differ from one another only in the configuration parameters covered by the hardware abstraction layer. The hardware abstraction layer may be generated using the same information that is used to describe the features being configured in the configurable processor. Automatic generation of the HAL greatly eases use of the HAL and the configurable processor, since the user is not required to manually write the HAL or adapt an existing one based on the processor configuration parameters.

16 Claims, 2 Drawing Sheets

U.S. PATENT DOCUMENTS

| | | | |
|---|---|---|---|
| 5,832,205 A * | 11/1998 | Kelly et al. | 714/9 |
| 5,857,106 A * | 1/1999 | Barbour et al. | 717/138 |
| 5,867,399 A | 2/1999 | Rostoker et al. | 364/489 |

| | | | | |
|---|---|---|---|---|
| 5,887,169 | A | * | 3/1999 | Lacombe ..................... 709/311 |
| 5,889,990 | A | | 3/1999 | Coleman et al. ............ 395/682 |
| 5,918,035 | A | * | 6/1999 | Van Praet et al. ............ 703/21 |
| 5,933,356 | A | | 8/1999 | Rostoker et al. ............ 364/489 |
| 5,995,736 | A | * | 11/1999 | Aleksic et al. ................ 716/18 |
| 5,999,730 | A | * | 12/1999 | Lewis ....................... 717/109 |
| 6,006,022 | A | * | 12/1999 | Rhim et al. .................... 716/1 |
| 6,028,996 | A | * | 2/2000 | Sniderman et al. ........... 703/23 |
| 6,031,992 | A | * | 2/2000 | Cmelik et al. .............. 717/138 |
| 6,035,123 | A | | 3/2000 | Razdan et al. .............. 395/709 |
| 6,052,524 | A | * | 4/2000 | Pauna ......................... 703/21 |
| 6,075,938 | A | * | 6/2000 | Bugnion et al. ............. 703/27 |
| 6,078,736 | A | * | 6/2000 | Guccione .................... 716/16 |
| 6,216,216 | B1 | * | 4/2001 | Bonola ........................ 712/28 |
| 6,230,307 | B1 | * | 5/2001 | Davis et al. .................. 716/16 |
| 6,269,409 | B1 | * | 7/2001 | Solomon .................... 709/329 |
| 6,275,893 | B1 | * | 8/2001 | Bonola ....................... 709/102 |
| 6,282,633 | B1 | * | 8/2001 | Killian et al. .............. 712/208 |
| 6,295,571 | B1 | * | 9/2001 | Scardamalia et al. ....... 710/308 |
| 6,321,323 | B1 | * | 11/2001 | Nugroho et al. ............. 712/34 |
| 6,415,379 | B1 | * | 7/2002 | Keppel et al. ................ 703/26 |
| 6,477,683 | B1 | * | 11/2002 | Killian et al. ................. 716/1 |
| 6,477,697 | B1 | * | 11/2002 | Killian et al. ................ 716/18 |
| 6,496,847 | B1 | * | 12/2002 | Bugnion et al. ............... 709/1 |
| 6,615,167 | B1 | * | 9/2003 | Devins et al. ................ 703/23 |

OTHER PUBLICATIONS

Stewart, D.B.; Schmitz, D.E.; Khosla, P.K.; "The Chimera II real–time operating system for advanced sensor–based control applications," IEEE Transactions on Systems, Man and Cybernetics, vol.: 22 Issue: 6, Nov./Dec. 1992, Page(s): 1282–1295.*

Box, B.; "Field programmable gate array based reconfigurable preprocessor," IEEE Workshop on FPGAs for Custom Computing Machines, Proceedings., 10–13 1994, Page(s): 40–48.*

Compton et al., "Confgurable Computing: A Survey of Systems and Software," *Technical Report*, Northwestern University, Dept. of ECE, 1999.

Hauck et al., "The Chimaera Reconfigurable Functional Unit," *Proceedings of the IEEE Symposium on Field–Programmable Custom Computing Machines*, 1997.

Razdan et al., "A High–Performance Microarchitecture with Hardware–Programmable Function Units," *Proceedings of MICRO–27*, Nov. 1997.

Wang et al., "Hardware/Software Instruction Set Configurability for System–on–Chip Processors," Proceedings of Design Automation Conference, 2001.

Singh et al., "Accelerating Adobe Photoshop with Reconfigurable Logic," FPGAs for Custom Computing Machines, 1998, pp. 236–244, XP–010298165.

Cygnus Solutions: "eCos Reference Manual—Version1.2.1" eCos Project Documentation, 'Online! May 17, 1999, XP–002192658.

Bursky, "Tool suite enables designers to craft customized embedded processors" Electonic Design, Feb. 8, 1999, Penton Publishing, USA 'Online! vol. 47, No. 3, XP–002192659.

* cited by examiner

ABSTRACTION OF CONFIGURABLE PROCESSOR FUNCTIONALITY FOR OPERATING SYSTEMS PORTABILITY

CROSS-REFERENCE TO RELATED APPLICATIONS

This application is related to U.S. patent application Ser. No. 09/246,047 to Killian et al.; Ser. No. 09/323,161 to Wilson et al.; Ser. No. 09/192,395 to Killian et al.; and Ser. No. 09/322,735 to Killian et al., all of which are hereby incorporated by reference; and is also related to the U.S. patent application Ser. No. 09/246,047 to Wang et al., filed on an even day herewith and entitled "Automated Processor Generation System for Designing a Configurable Processor and Method for the Same".

BACKGROUND OF THE INVENTION

1. Field of the Invention

The present invention is directed to operating systems and real-time operating systems as well as systems and techniques for developing the same, and in particular it is directed to operating systems and real-time operating systems for processors that have easily configurable features.

2. Background of the Related Art

Operating systems (OSes) and real-time operating systems (RTOSes) provide basic software services required by a variety of software applications. An OS or an RTOS brings together in one package the basic services that are common to many applications. By doing so, the OS or the RTOS keeps the application developer from duplicating those basic services within each application. For reasons described in greater detail below, the following discussion will focus on RTOSes; however, it should be kept in mind that the information disclosed herein is also applicable to OSes.

Most of the basic features supplied by an RTOS are not specific to features supplied by a particular processor. Only a small fraction of the services that an RTOS supplies are specific to a particular processor. For example, an operating system often manages basic input and output operations. Traditional POSIX-style I/O interfaces require many things that are not processor-specific. At the same time, however, I/O usually requires interaction with processor-specific features like interrupts. Consequently, operating systems in general group such processor-specific features into a unit and define an interface to that unit. Different operating systems use different names for this interface: the VxWorks® RTOS from Wind River Systems, Incorporated of Alameda, Calif. calls this layer the architecture layer; Windows NT® calls it the HAL; and the Nucleus RTOS from Advanced Technology, Incorporated of Mobile, Ala. has no specific name for the interface, but simply provides an implementation in a small set of files which are referenced in their portability documentation.

In all cases, this set of services (called herein the abstraction layer) is designed as a convenience to the operating system's higher-level features. Consequently, this abstraction layer varies from one RTOS to another, and the functionality it provides is specific to the operating system even though part of the implementation is specific to a processor.

As a result, the implementation of this abstraction layer becomes a combination of processor-specific coding and operating system coding. If either the processor or the operating system changes, the implementation of the abstraction layer needs to be modified. Such a manual reimplementation of operating system services when the processor is modified becomes especially problematic in the case of a configurable processor.

The problem of different members of traditional processor families offers a limited parallel to the problems of a configurable processor. Operating systems have, to date, dealt with these problems using several different methodologies applied to the architecture layer of the operating system.

The first of these methodologies is source code preprocessor directives that allow the user to include code for all of the processors in a single module. In this case, modules in the architecture layer are instrumented with preprocessor directives. Which processor is being supported is selected at compile time by the build system. The other code, though included in the source code, is not in the object code.

There are difficulties with this method. Code that is not being compiled is not being tested for correctness. Since the interface to sections of code switched with the preprocessor directives is ill-defined, this is a source of common code breakage. Building the architecture layer for a particular configuration requires that all of the source code in the module be rebuilt, even though much of it may be processor-independent. Readability of the source code is often more difficult because of the additional complexity that the preprocessor directives introduce. Maintenance of the source code is made more difficult for the same reason.

The second of these methodologies is run-time determination of processor features. Consider several members of a processor family that differ from one another only by the size of the instruction cache. A set of code can be written that at run time determines the cache size.

There are difficulties with this method as well. Not all features can be successfully run-time detected. So, while presence of cache is available for detection, generation of certain interrupts may not be detectable. Determining processor configuration at run time can be less efficient as well in that more time is taken to determine the configuration. Also note that in the cases where family members extend the ISA using the same register indices and/or opcodes, it is even more likely that runtime detection will not be possible. This case is quite common for an extensible processor where different uses are extending the ISA at the same time.

The last of these methodologies is the creation of a separate source file for each member of the CPU family. This is a different expression of the first methodology.

The problems here related to the content of this source file. Because architecture layers are OS-centric rather than processor-centric, the content of these files has large content that is not processor-specific. When this content needs to change, the change must be propagated across all of the files. Since each CPU family member has its own file, again a maintenance problem is created.

OSes and RTOSes make use of the abstraction layer in different ways; for example, certain issues which make the abstraction layer appropriate for use with an RTOS are not present in the OS environment. On the other hand, many RTOS do not use ancillary devices such as MMU translators which can be abstracted by the abstraction layer for an OS.

A configurable processor is a processor that acquires different characteristics based on a user specification. In this case, the set of processor features that must be handled by the abstraction layer is not static and must adapt to different processor configurations. Today processors have been introduced in families with each member of the family containing a different set of features from the other members of the family; however, the number of processors in any given family has been relatively small—especially when compared to the number of different processors that can be produced by a configurable processor generator.

Note, however, that not all processor configurations are substantially different from the operating system perspective. Changes to some configuration parameters are transparent to the operating system because these changes do not affect the processor at a software functional level and, thus, the operating system is not affected. For example, processor configuration include information about the technology that is to be used to create the processor. This configuration substantially affects the generation of the processor, but does not affect the software that runs on the processor. In the following discussion it is assumed that the phrase "different configuration" implies a configuration on which an OS or RTOS produced for another configuration will not work properly due to the differences between the two configurations.

As mentioned previously, this abstraction layer consists of two separate conceptual components. The first component includes operating system-specific logic and functionality whereas the second component includes processor-specific logic and functionality. In existing solutions, these two components are meshed together. Such an implementation introduces significant problems when the abstraction layer must be reimplemented due to changes to the processor feature set. Because of the close interaction between the operating system and the processor functionality, the reimplementation can produce problems in either area of the abstraction layer.

Moreover, changes to the operating system demands of the abstraction layer can force reimplementation of the processor-specific sections of the abstraction layer because the two are intermingled. So, if the operating system changes in a way that drives a change into the architecture layer then, because of the intermingling of operating system-specific code and processor-specific code, the processor-specific code must be revisited as well. This causes additional expense, effort and time.

Even if the processor support were firmly and cleanly separated from the operating system support, changing the processor feature set would still require reimplementation of the processor portion of the abstraction layer for each configuration that had differences visible to the operating system. Such a manual reimplementation is error-prone and time consuming.

Finally, there are operating system support issues for differently configured processors. Some operating systems, such as the aforementioned VxWorks® system, are distributed in binary form; that is, they have been compiled prior to delivery. Such a compiled form includes both aspects of the abstraction layer, i.e., processor-specific logic and operating system-specific logic. Clearly, under such a model the precompiled version of the operating system cannot support different configurations of the processor.

SUMMARY OF THE INVENTION

The present invention has been made with the above problems of the prior art in mind, and it is an object of the present invention to provide an abstraction layer between an operating system and the underlying processor which is easily modifiable.

It is a further object of the present invention to provide an abstraction layer which is particularly suitable for use with a configurable processor.

It is another object of the present invention to provide an abstraction layer which can be easily reimplemented in response to changes in the feature set of the underlying processor.

It is a still further object of the present invention to provide an abstraction layer which has easily reimplementable portions corresponding to configurable processor features visible to the operating system.

It is yet another object of the present invention to provide an abstraction layer which provides a standardized and consistent abstraction interface over a number of operating systems.

It is a further object of the present invention to provide an abstraction layer between an operating system and an underlying configurable processor which can be generated from a description of the configurable processor features.

It is another object of the present invention to provide a system and method for generating an abstraction layer between an operating system and an underlying configurable processor from a description of the configurable processor features.

The above objects are achieved according to a first aspect of the present invention by providing a hardware abstraction layer as a system architectural layer operating between a real-time operating system and an underlying configurable processor. The hardware abstraction layer provides an abstraction of processor-specific functionality to the operating system. In particular, it abstracts configurable processor features visible to the operating system to provide a uniform, standardized interface between the operating system and the configurable processor on which it runs. Thus, an operating system running on top of the hardware abstraction layer will work on all configurations of the processor which differ from one another only in the configuration parameters covered by the hardware abstraction layer.

The above objects are further achieved according to a second aspect of the present invention by facilitating automatic generation of the HAL based on a processor description. Here, the same information that is used to describe the features being configured in the configurable processor is used to automatically generate a HAL appropriate to that processor. Automatic generation of the HAL greatly eases use of the HAL and the configurable processor, since the user is not required to manually write the HAL or adapt an existing one based on the processor configuration parameters.

BRIEF DESCRIPTION OF THE DRAWINGS

These and other objects, features, and advantages of the present invention are better understood by reading the following detailed description of the preferred embodiment, taken in conjunction with the accompanying drawings, in which.

DETAILED DESCRIPTION OF PRESENTLY PREFERRED EXEMPLARY EMBODIMENTS

In perhaps its broadest aspect, there are two facets to the present invention. First, the Hardware Abstraction Layer (HAL) described herein solves the problem of operating system support for changing processor configurations. The HAL provides a software interface designed to contain and describe the processor-centric operations. This software interface remains constant across operating systems since it does not contain any operating system-specific logic and functionality.

The second facet is the automatic generation of the HAL based on a processor description. Here, the same information that is used to describe the features being configured in the configurable processor is used to automatically generate a HAL appropriate to that processor. Automatic generation of the HAL greatly eases use of the HAL and the configurable processor, since the user is not required to manually write the HAL or adapt an existing one based on the processor configuration parameters.

In a preferred embodiment of the present invention (hereinafter the preferred embodiment of the HAL will be referred to simply as "the HAL"), the HAL is part of an automated configurable processor development system which permits a user to provide a processor configuration description that is used not only to generate a physical description of the processor in a suitable hardware description language which is suitable for fabrication, but also is used to generate software development tools such as compilers, debuggers and the like which are suitable for use with the configured processor. A system of this type is the Xtensa configurable processor development system of Tensilica, Incorporated of Santa Clara, Calif. which is described in the aforementioned patent applications.

Figure 1:
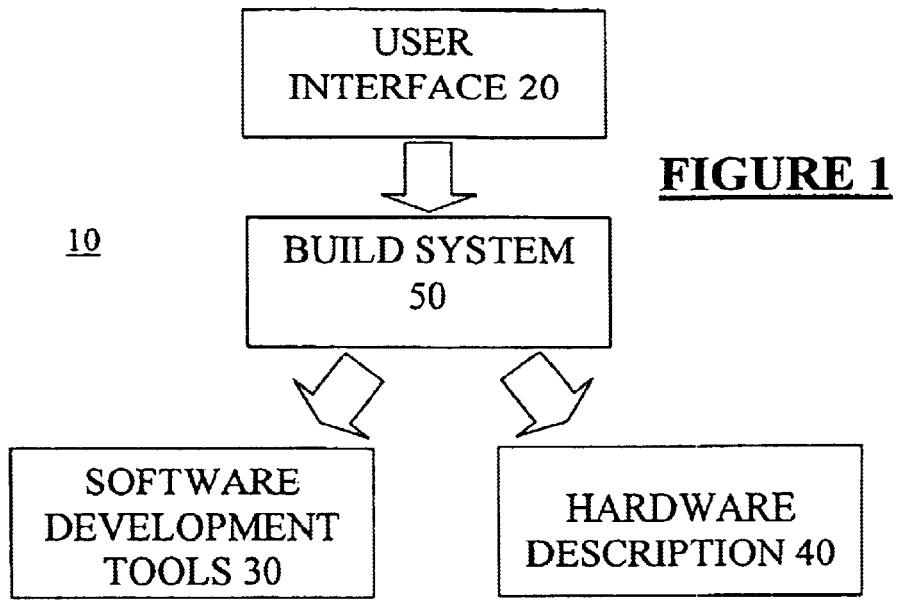
FIG. 1 is an overall block diagram of a preferred embodiment of the present invention.

An automated processor generation system 10 such as the Xtensa system has four major components as shown in FIG. 1: a user configuration interface 20 through which a user wishing to design a processor enters her configurability and extensibility options and other design constraints; a suite of software development tools 30 which can be customized for a processor designed to the criteria chosen by the user; a parameterized, extensible description of a hardware implementation of the processor 40; and a build system 50 receiving input data from the user interface, generating a customized, synthesizable hardware description of the requested processor, and modifying the software development tools to accommodate the chosen design. Preferably, the build system 50 additionally generates diagnostic tools to verify the hardware and software designs and an estimator to estimate hardware and software characteristics. Further details of this aspect of the system may be found in U.S. patent application Ser. Nos. 09/246,047 and 09/322,735 to Killian et al.

Figure 2:
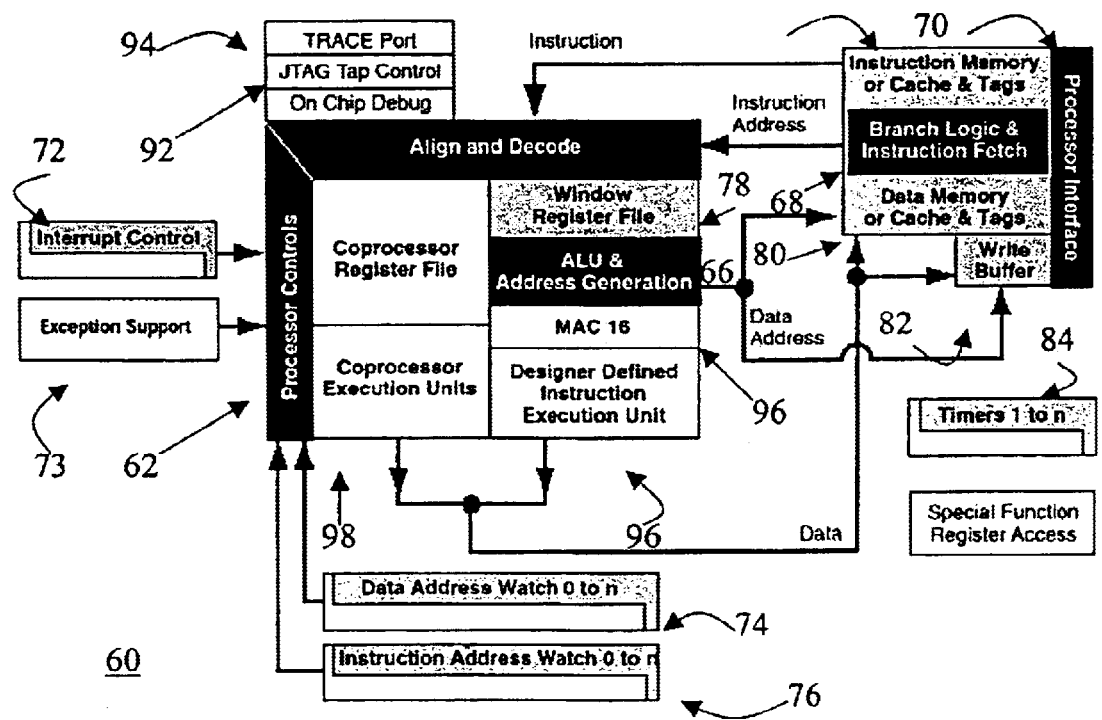
FIG. 2 is a block diagram of the architecture of a configurable processor according to the preferred embodiment.

In the preferred embodiment, the basis for processor configuration is the Xtensa architecture 60 shown in FIG. 2. A number of elements of the architecture are basic features which cannot be directly modified by the user. These include the processor controls section 62, the align and decode section 64 (although parts of this section are based on the user-specified configuration), the ALU and address generation section 66, the branch logic and instruction fetch 68, and the processor interface 70. Other units are part of the basic processor but are user-configurable. These include the interrupt control section 72, the data and instruction address watch sections 74 and 76, the window register file 78, the data and instruction cache and tags sections 80, the write buffers 82 and the timers 84. The remaining sections shown in FIG. 2 are optionally included by the user. Further description of the processor architecture may be found in U.S. patent application Ser. No. 09/192,395 to Killian et al.

The HAL

The HAL is a software interface that abstracts configurable portions of the configurable processor core. Although as noted above the HAL is implemented as part of the Xtensa configurable processor system, it will be clear to those skilled in the art that the present invention may be implemented in conjunction with a wide range of configurable processors.

The HAL gives the operating system and the system software developer a platform on which to develop software that will function properly on all different configurations of the Xtensa microprocessor that have the same Application Binary Interface (ABI). A run-time system that has been developed on top of the HAL can work with all Xtensa configurations that differ from one another on only the parameters abstracted by the HAL.

The HAL is an operating system enabler. It provides mechanisms to perform basic operating system support functions for the configurable portions of the Xtensa architecture. It also provides the system information necessary to develop a configuration-independent run-time system.

This embodiment of the HAL does not necessarily provide a solution for all the OS-related issues raised by the processor configurability. It need not provide a run-time system that completely surrounds the processor architecture; consequently, the user does not have the entire processor architecture wrapped for them. The HAL is a support library and need not be an environment. The existence of a base architecture gives the user enough stability to provide a run-time framework outside the HAL.

An example of this has to do with the location of the various vectors. The Xtensa processor allows the location of vectors to be specified in the processor configuration—in particular, the vector location and whether or not that location is in RAM or ROM is available as a part of the configuration process. The HAL could provide handlers for all of the vectors and provide callbacks to the operating system after the HAL has first taken control; however, that it not what is done in the preferred embodiment because first control is something that operating systems expect to have.

Furthermore, the HAL need not serve as a functional abstraction of architectural features. A functional abstraction of architectural features would take every configuration parameter that has a run-time effect and would abstract that configuration parameter with a function call. But, a functional abstraction of the configuration space would likely result in poor performance. Consider, for example, a set of TIE instructions designed to work together to do JPEG data compression. If each of these instructions were to be wrapped with a HAL layer, then the efficiency provided by the TIE instructions would be eclipsed by the overhead of the HAL itself. Further, TIE can be applied to any type of computational problem. As a result, it is impossible to predict the operations that TIE can perform. This would force an even more generic interface than described above. Therefore, the HAL does not provide such an abstraction of the architectural features.

Finally, because the HAL is a library that runs on Xtensa, the preferred embodiment cannot abstract configuration choices that fundamentally change the executable code. Some configuration options fundamentally affect the encoding of instructions and, therefore, affect the ability of the core to execute an instruction stream. Hence, the compiled form of the base instruction set architecture (ISA) is not necessarily compatible across configurations that differ on these configurations options. Endianness is such an option because the instruction set architecture has a different instruction encoding based on the whether the processor is configured to be big endian or little endian. The HAL cannot make a little endian executable run on a big endian processor because it does not recompile the application against which it is linked. Other possible configurability options include but are not limited to high code density/normal code density, and register windowing/no register windowing. Different versions of the RTOS kernel objects can be provided corresponding to various combinations of these configuration options which create execution stream incompatibility.

With parameters such as endianess, code density and register windowing held the same, an application compiled for a base ISA written to the HAL and linked against the HAL library for a particular processor configuration will run correctly on that configuration; however, it may not run most efficiently. For example, consider an integer multiplication unit. The base Xtensa ISA of the preferred embodiment does not include an integer multiplier, so code compiled for this base will not make use of instructions accessing the unit. Using such instructions might, however, increase the performance of the run-time code; however, recompilation of the run-time code will be necessary to make use of that efficiency.

In the Xtensa processor with which the preferred embodiment is implemented, register windows are restrictive in the execution context in which they can be used; however, the tool chain will only compile C code to the register window calling convention. Applications need to invoke HAL from both C code where register window calling is allowed and from assembly in execution states where register window calling is prohibited. For this reason two entry points wrap each HAL operation.

The first is a register window entry point. This entry point is C-callable and is invoked by the call_n and callx_n instructions. As with all functions invoked by call_n and callx_n, the first instruction at the entry point is an entry instruction.

The second of these is a non-window entry point. Because the intent of HAL is in part to provide support for pre-compiled executables working on different configurations, some of which must be invoked from interrupt context, some sort of call and return mechanism is required. The Xtensa architecture does not support windowed call and return when the processor is running at processor interrupt levels greater than 0. The ISA continues to support the non-window call and return mechanism on cores with register windows. This makes an ideal mechanism to use for the interrupt safe call and return mechanism. Therefore, each operation of the HAL also has a non-window call and return entry point. The entry point is to be invoked with the call8 instruction and will finish with a ret instruction.

Assuming a CALL8 instruction, the registered window calling convention is shown in TABLE I:

TABLE I

| Register | Function |
| --- | --- |
| a0–a7 | Saved by the call8 |
| a8 | Linking register |
| a9 | Callee stack pointer |
| a10 | First argument and return value |
| a11–a15 | Additional arguments |

The non-window calling convention is shown in TABLE II:

TABLE II

| Register | Function |
| --- | --- |
| a0 | Linking register |
| a1 | Stack pointer |
| a2 | First argument and return value |
| a3–a11 | Additional arguments |
| a12–a15 | Callee saved registers |

In general the register window handlers are configuration independent. The presence or absence of register windows fundamentally affects the code that is generated by the compiler and hence cannot be abstracted by the HAL. That having been said, the size of the register file is configurable. While this size is relatively easy to compute at run time, this information is also in the HAL.

```
extern const unsigned int Xthal_num_regs;   // number of
                                            registers in
                                            the reg file
```

If registers are not windowed, xthal_num_regs indicates the number of registers, i.e., 16.

All entry points in the HAL begin with the prefix xthal_. All entry points that support the non-window calling convention are suffixed with _nw. Data references in the HAL are prefaced with xthal_. As examples:

```
void xthal_function();       // safe to call from C.
void xthal_function_nw();    // safe to call with
                             windows not allowed.
int  Xthal_data;             // some data reference.
```

Functions in the HAL that accept arguments will accept as parameters all possible valid configuration values. For example, Xtensa has up to eight coprocessors. The xthal_save_cpregs(void *save_area, int the_cp) function will accept as the_cp values from zero through seven. It will accept these values independent of the number of coprocessors the user has actually configured. Even if the user has configured but one coprocessor, the values one through seven will still be accepted. In the case that a possible option is not actually present, the HAL will do nothing and return benign values.

Unless otherwise stated, the same holds for arrays whose indices are configurable. The HAL will have these arrays large enough so that all possible indices index valid values. As an example, the Xtensa processor has up to 15 interrupt levels. The Xthal_int_level_mask [ ] array therefore is declared to have 15 entries, independent of the user's configuration. References to unconfigured entries will again have "benign" values—in this case, 0.

The areas abstracted by the HAL include saving and restoring processor state; initializing and controlling coprocessors; interrupts; timers; cache; debug; and disassembly. Other possible areas of abstraction are memory management units (MMUs) and PIFware devices. By abstracting each of these areas, an operating system or a run-time system developed on top of the HAL will work on all configurations that differ from one another on only the configuration parameters covered by the corresponding abstractions. Each of these areas will be described in detail.

Saving and Restoring Processor State

The state of a configurable processor is variable and depends on configuration time choices. One of the critical tasks of an operating system is to save and restore the processor state on a context switch. Xtensa can extend the state of the processor in two basic ways. The first of these extends the processor state with information that must be saved and restored on each context switch. These are called "extra" routines because they are saving "extra" state of the processor that is not associated with a particular coprocessor. The second of these extends the processor state with information that can be saved and restored lazily based on contents of the CPENABLE register. These are called "cpreg" routines because they deal with saving coprocessors and their associated register files. As a result, the HAL provides two sets of entry points, each of which has both windowed and non-windowed entry points.

The first set of entry points provides support for saving and restoring the processor state that is not tied to a TIE register file. Consider the following example TIE:

```
state s32 32
state s16 16
state s8 8
state result 32
user_register 0 {s16, s8}
user_register 1 s32
user_register 100 result
regfile i32      32      16      i32
regfile i16      16      16      i16
regfile i8       8       16      i8
operand i32s  s {i32[s]}
operand i32t  t {i32[t]}
operand i32r  r {i32[r]}
operand i16s  s {i16[s]}
operand i16t  t {i16[t]}
operand i16r  r {i16[r]}
operand i8s   s {i8[s]}
operand i8t   t {i8[t]}
operand i8r   r {i8[r]}
operand offset32   imm8 {{{22{imm8[7]}},imm8[7:0],2'b00}}
{offset32 [9:2]}
operand offset16   imm8 {{{23{imm8[7]}},imm8[7:0],1'b0}}
{offset16[8:1]}
operand offset8    imm8 {{{24{imm8[7]}},imm8[7:0]}}
{offset8[7:0]}
opcode    I32L  r=0    LSCI
opcode    I32S  r=1    LSCI
opcode    I16L  r=2    LSCI
opcode    I16S  r=3    LSCI
opcode    I8L   r=4    LSCI
opcode    I8S   r=5    LSCI
opcode    I32AND   op2=0   CUST0
opcode    I16AND   op2=1   CUST0
opcode    I8AND    op2=2   CUST0
opcode    addition op2=3   CUST0
interface VAddrOffset   32     core out
interface VAddrBase     32     core out
interface LSSize        5      core out
interface MemDataOut32  32     core out
interface MemDataIn32   32     core in
interface MemDataOut16  16     core out
interface MemDataIn16   16     core in
interface MemDataOut8   8      core out
interface MemDataIn8    8      core in
interface VAddrIn       32     core in
iclass l32 {I32L} {out i32t, in ars, in offset32} {} {
   out VAddrOffset, in MemDataIn32, out LSSize, out
VAddrBase
}
iclass s32 {I32S} {in i32t, in ars, in offset32} {} {
   out VAddrOffset, out MemDataOut32, out LSSize, out
VAddrBase
}
iclass l16 {I16L} {out i16t, in ars, in offset16} {} {
   out VAddrOffset, in MemDataIn16, out LSSize, out
VAddrBase
}
iclass s16 {I16S} {in i16t, in ars, in offset16} {} {
   out VAddrOffset, out MemDataOut16, out LSSize, out
VAddrBase
}
iclass l8 {I8L} {out i8t, in ars, in offset8} {} {
   out VAddrOffset, in MemDataIn8, out LSSize, out VAddrBase
}
iclass s8 {I8S} {in i8t, in ars, in offset8} {} {
   out VAddrOffset, out MemDataOut8, out LSSize, out
VAddrBase
}
iclass i32     {I32AND}    {out i32r, in i32s, in i32t}
{inout s32}
iclass i16     {I16AND}    {out i16r, in i16s, in i16t}
{inout s16}
iclass i8 {I8AND}    {out i8r, in i8s, in i8t}    {inout
s8}
iclass add {addition} {out arr, in ars, in art} {out result}
semantic ls {I32L, I16L, I8L, I32S, I16s, I8S}
{
   assign LSSize = (I32L | I32S)  ? 5'b00100 :
       (I16L | I16S)   ? 5'b00010 : 5'b00001;
   assign VAddrOffset = (I32L | I32S)   ? offset32 :
       (I16L | I16S)   ? offset16 : offset8;
   assign VAddrBase = ars;
   assign i32t = MemDataIn32;
   assign i16t = MemDataIn16;
   assign i8t = MemDataIn8;
   assign MemDataOut32 = i32t;
   assign MemDataOut16 = i16t;
   assign MemDataOut8 = i8t;
}
reference I32L
{
   assign LSSize = 5'b00100;
   assign VAddrOffset = offset32;
   assign VAddrBase = ars;
   assign i32t = MemDataIn32;
}
reference I32S
{
   assign LSSize = 5'b00100;
   assign VAddrOffset = offset32;
   assign VAddrBase = ars;
   assign MemDataOut32 = i32t;
}
reference I16L
{
   assign LSSize = 5'b00010;
   assign VAddrOffset = offset16;
   assign VAddrBase = ars;
   assign i16t = MemDataIn16;
}
reference I16S
{
   assign LSSize = 5'b00010;
   assign VAddrOffset = offset16;
   assign VAddrBase = ars;
   assign MemDataOut16 = i16t;
}
reference I8L
{
   assign LSSize = 5'b00001;
   assign VAddrOffset = offset8;
   assign VAddrBase = ars;
   assign i8t = MemDataIn8;
}
reference I8S
{
   assign LSSize = 5'b00001;
   assign VAddrOffset = offset8;
   assign VAddrBase = ars;
   assign MemDataOut8 = i8t;
```

-continued

```
}
semantic and {I32AND, I16AND, I8AND} {
    assign i32r = i32s & i32t;
    assign s32 = s32 ^ i32s ^ i32t;
    assign i16r = i16s & i16t;
    assign s16 = s16 ^ i16s ^ i16t;
    assign i8r = i8s & i8t;
    assign s8 = s8 ^ i8s ^ i8t;
}
reference I32AND {
    assign i32r = i32s & i32t;
    assign s32 = s32 ^ i32s ^ i32t;
}
reference I16AND {
    assign i16r = i16s & i16t;
    assign s16 = s16 ^ i16s ^ i16t;
}
reference I8AND {
    assign i8r = i8s & i8t;
    assign s8 = s8 ^ i8s ^ i8t;
}
reference addition {
    assign arr = ars + art;
    assign result = ars + art;
}
ctype i32 32 32 i32
ctype i16 16 16 i16
ctype i8 8 8 i8
proto I32L {out i32 v, in i32 *p, in immediate o} {} {I32L v, p, o;}
proto I32S {in i32 v, in i32 *p, in immediate o} {} {I32S v, p, o;}
proto I16L {out i16 v, in i16 *p, in immediate o} {} {I16L v, p, o;}
proto I16S {in i16 v, in i16 *p, in immediate o} {} {I16S v, p, o;}
proto I8L {out i8 v, in i8 *p, in immediate o} {} {I8L v, p, o;}
proto I8S {in i8 v, in i8 *p, in immediate o} {} {I8S v, p, o;}
proto i32_loadi {out i32 v, in i32 *p, in immediate o} {} {I32L v, p, o;}
proto i16_loadi {out i16 v, in i16 *p, in immediate o} {} {I16L v, p, o;}
proto i8_loadi {out i8 v, in i8 *p, in immediate o} {} {I8L v, p, o;}
proto i32_storei {in i32 v, in i32 *p, in immediate o} {} {I32S v, p, o;}
proto i16_storei {in i16 v, in i16 *p, in immediate o} {} {I16S v, p, o;}
proto i8_storei {in i8 v, in i8 *p, in immediate o} {} {I8S v, p, o;}
proto i32_move {out i32 r, in i32 s} {} {I32AND r, s, s;}
proto i16_move {out i16 r, in i16 s} {} {I16AND r, s, s;}
proto i8_move {out i8 r, in i8 s} {} {I8AND r, s, s;}
schedule load8 {I8L} {
    def i8t 2;
}
schedule load16 {I16L} {
    def i16t 2;
}
schedule load32 {I32L} {
    def i32t 2;
}
coprocessor cp1 1 {i8, i16, s8, s16}
coprocessor cp2 2 {i32, s32}
```

This TIE adds the user register number 100 to the processor state and does not associate this state with a particular coprocessor. As a result, this processor state must be saved and restored on every context switch. The routines to support this include:

void xthal_save_extra(void *base);
    void xthal_restore_extra(void *base);
    void xthal_save_extra_nw(void *base);
    void xthal_restore_extra_nw(void *base);

Note that parameter of type void* is a pointer to the bottom of the area where the state would be stored and it should be aligned to a four-byte boundary. Extra TIE state does not have a separate path to memory and must be read into the processor address registers before being saved or restored with the l32I and s32I instructions. These instructions ignore the two lower bits when reading and writing to memory. Depending on the implementation, the memory allocated for this area can come from a variety of different places, and some consideration should be given from where to allocate this memory. Memory could be allocated from the base of the stack. This allows the operating system to use the information provided by the HAL to size the storage area at run time. Another possible choice is the task control block (TCB). Many operating systems store register information in the TCB. If the TCB is represented as a C structure, this restricts the ability of the operating system to deal with the additional state without recompilation of the operating system since the size of the save area is specified in the structure. In general, the operating system simply needs to provide sufficient space for storage of the state and appropriate alignment of the memory.

TIE register files are handled with a similar mechanism except that an additional parameter is needed to specify which TIE register file is being handled in a particular call.

void xthal_save_cpregs(void *base, int regFileId);
    void xthal_restore_cpregs(void *base, int regFileId);
    void xthal_save_cpregs_nw(void *base, int regFileId);
    void xthal_restore_cpregs_nw(void *base, int regFileId);

The HAL also provides a set of constants that specify the size of the required save areas. This information can be used when allocating the memory required to save the processor state.

const unsigned int Xthal_extra_size;
    const unsigned int Xthal_cpregs_size[cpregs];
    const unsigned int Xthal_all_extra_size;

Among the routines contained in the HAL, there is a set of routines that can be used to access individual processor registers within the saved processor state. The routines contained in the HAL include the calls xthal_read_extra, xthal_write_extra, xthal_read_cpreg, xthal_write_cpreg, and xthal_which_cp. These are meant for use with special and user registers. The base parameter is the pointer used to store extra state with the xthal_save_extra or xthal_save_cpregs calls. reg is a unique register number specified below.

The base parameter points to the save area. The reg parameter is the number of the register being accessed. In order to promote inter-operability between host side tools and target agents, the HAL assumes the following register numbering convention. This numbering convention is designed to minimize the complexity of mapping between query register numbers and physical register numbers. A register number is a 16-bit value. The most significant nibble describes the type of register. In the case of address registers, the second nibble is used to describe if the register is directly accessible (a0–a15) or if the register is a physical register number in the register file. Special registers are numbered as in the Xtensa ISA. User register numbers are open to implementation. However, registers larger than 32-bits should be split into multiple 32-bit quantities for the purpose of accessing from host tools.

The first four of the functions below return the register number if successful or −1 if the register number does not map as extra state. xthal_which_cp returns the coprocessor corresponding to the register number of −1 if it doesn't map to a coprocessor.

00000000xxxxxxxx→ar register logical
00001000xxxxxxxx→ar register physical
0001xxxxxxxxxxxx→special register
0010xxxxxxxxxxxx→user register

```
int xthal_read_extra(void *base, unsigned int reg,
    unsigned int *value);
int xthal_write_extra(void *base, unsigned int reg,
    unsigned int value);
int xthal_read_cpreg(void *base, int cp, unsigned int
    reg, unsigned int *value);
int xthal_write_cpreg(void *base, int cp, unsigned int
    reg, unsigned int value);
int xthal_which_cp(unsigned reg);
```

In each of these calls, the value of the register is specified by the value parameter to the call.

The save and restore functions handle issues of stack layout. The caller is not responsible for laying the save areas out in the stack. This makes these functions easy to use for saving and restoring to and from the stack or other contiguous area. They are correspondingly more complex to use for saving information to different areas.

| | |
|---|---|
| movi a2, cur_tcb_ptr | // load a1 with the tcb pointer address |
| l32i a2, a1, 0 | // load a1 with the address of the tcb. |
| l32i a14, a1, TCB_SP_BASE_OFFSET | // load a14 with stack base |
| movi a2, a14 | // set the base pointer argument |
| movi a12, xthal_save_extra_nw | // load the save address |
| callx0   a12 | // call xthal_save_extra_nw |
| movi a12, xthal_save_cpregs | // load the coprocessor save address |
| movi a13, 0 | // start at cp 0. |
| cp_save_loop: | |
| mov a3, a13 | // set the cp call parameter |
| mov a2, a14 | // set the base pointer call parameter |
| callx0   a12 | // call xthal_save_cpregs |
| addi a13, a13, 1 | // step to the next cp |
| bnei a13, 8, cp_save_loop | // loop through all the cp's. |

Note that the value of the base pointer is computed only once and is not changed. These routines are handling the stack layout with the sole exception that they are not accounting for the windowed save area.

Of course, this is a grossly inefficient implementation of TIE coprocessor switching because all coprocessors are saved and restored on every context switch. As a result, extra switching is occurring. Implementing lazy switching will keep this work from being done for coprocessors that the task does not use. It also avoids the loop through all of the coprocessors.

C code to save all of the state to a block of malloc( ) ed memory would look like this:

```
void save_all_extra(void *io_area, int in_size)
{
    int cp;
    xthal_save_extra( io_area );
    for( cp = 0 ; cp < 8 ; cp++ )
    {
    xthal_save_cpregs( io_area, cp );
    }
}
```

This routine makes it quite clear that the save and restore functions access the state downwards through memory. Note again that the pointer to the save area does not move from call to call. In the case where the calls to save and restore are being performed lazily, this keeps the context switch from having to store any additional state. The storage layout is shown in TABLE III:

TABLE III

| Storage Layout |
|---|
| Low address |
| Extra |
| CP_1 |
| CP_2 |
| . . . |
| CP_N |
| High address |

Coprocessor Initialization and Control

Initialization of the various extra registers and TIE coprocessors is also done in the HAL. These functions closely track the save and restore entry points.

| | |
|---|---|
| void xthal_init_extra(void); | // initialize the extra processor state |
| void xthal_init_cp(int cp); | // initialize the TIE coprocessor |
| void xthal_init_extra_nw(void); | // (non-windowed versions . . . ) |
| void xthal_init_cp_nw(int cp); | // ( . . . ) |

The xthal_init_extra calls set all additional portions of processor state that are not grouped into TIE coprocessors to a safe and ready for use condition. The xthal_init_cp calls perform the same task to a particular TIE coprocessor. Note that a task save area can be initialized with "safe" data by calling an init followed by a save, or better (to avoid touching real registers) by using the init_mem functions below.

It can be helpful to initialize a block of memory with valid data for a restore. Using a restore on this data will put these functional units into a state that is identical to using the init call followed by a save, but without disturbing the actual registers.

```
void xthal_init_mem_extra(void *base); // initialize the
    extra processor
void xthal_init_mem_cp(void *base, int cp); // initialize
    the TIE coprocessor
void xthal_init_mem_extra_nw(void *base); // (non
    windowed versions . . . )
void xthal_init_mem_cp_nw(void *base, int cp);
    // ( . . . )
```

Each coprocessor register file has state indicating whether or not access to the register file is enabled. Accessing a disabled register file causes an exception. The routines contained in the HAL that allow the OS to indicate whether or not the data in a given TIE register file are valid include:

```
void xthal_validate_cp(int cp);
void xthal_invalidate_cp(int cp);
void xthal_validate_cp_nw(int cp);
void xthal_invalidate_cp_nw(int cp);
```

In general all routines in the HAL will accept any parameters that could be valid in any valid configuration. For example, the validate and invalidate calls above will accept a cp of 7 (the highest coprocessor index) even if the user specifies only three co-processors in the configuration. In such cases the routines will return "safe" values and/or perform no operation, as appropriate.

On the other hand, certain efficiencies may be gleaned by knowing the number of coprocessors present. This number can be obtained from the HAL as:

```
const unsigned int Xthal_num_coprocessors;
```

The Xtensa architecture allows for up to eight coprocessors, so the user can always invoke these functions for all possible coprocessors. The code looks like:

```
int i;
for (i=0; i<8; i++) xthal_invalidate_cp(i);
```

Alternatively, the information regarding number of coprocessors actually used can be used to cut down the number of loop iterations:

```
int i;
for (i=0; i<xthal_num_coprocessors; i++) xthal_invalidate_cp(i);
```

Interrupts

The total numbers of configured interrupts and of interrupt levels are available through two constants provided by the HAL:

```
extern const unsigned int Xthal_num_int_levels;   // the number of interrupt levels
extern const unsigned int Xthal_num_ints;         // the number of interrupts
```

Knowing which interrupts are at a given interrupt level is important because it allows for easy masking of all interrupts at that level. The HAL provides this information through two sets of constants. The first set includes a thirty-two-bit word for each interrupt level. Each bit in each of these words is set if the corresponding interrupt is at that level and is cleared if the corresponding interrupt is not at that level. The corresponding definition provided by the HAL is:

```
extern const unsigned int Xthal_int_level_mask[16]; // mask for level of interrupts
```

Note that the first entry in this array (offset 0) is the mask for level 1 interrupts.

The HAL also provides a thirty-two-bit word for each interrupt level indicating which interrupts correspond to this level and all levels below it. This information can be used when wanting to shut off all interrupts at a given level and below. The constants representing this information in the HAL are defined as follows:

```
extern const unsigned int Xthal_int_level1_to_n_mask[14]; // mask for level 1 to N interrupts
```

Note that the first entry in this array (offset 0) is the mask to turn off level 1 and level 2 interrupts. Information about how to turn off level one interrupts is in xthal_int_level_mask. Also note that the second set of constants can be derived from the first.

Each interrupt has a level and a type. The HAL provides two arrays of constants that describe this information:

```
extern const unsigned int Xthal_int_level[32];   // level per interrupt
extern const unsigned int Xthal_int_type[32];    // type per interrupt
```

Note that in the case that the user has configured less than 32 interrupts (or less than 15 levels) the HAL still supports data entries for these unconfigured resources. The user may depend on these labels being in the HAL independent of the presence of the actual item in the configuration.

Finally, the HAL contains four constants that map interrupt types to interrupts:

```
extern const unsigned int Xthal_int_type_edge;     // mask of the edge-triggered external interrupts
extern const unsigned int Xthal_int_type_level;    // mask of the level-triggered external interrupts
extern const unsigned int Xthal_int_type_timer;    // mask of the timer interrupts
extern const unsigned int Xthal_int_type_software; // mask of the software interrupts
```

In addition to the constants described above, the HAL contains routines that provide access to the INTENABLE and INTERRUPT registers. Each bit in these registers corresponds to an interrupt, with bit position numbers corresponding to interrupt numbers. Up to 32 interrupts can be configured, numbered from 0 to n−1 where n is the number of interrupts configured.

```
extern unsigned int    xthal_get_intenable( void );
extern void            xthal_set_intenable( unsigned int );
extern unsigned int    xthal_get_intread( void );
extern void            xthal_set_intset( unsigned int );
extern void            xthal_set_intclear( unsigned int );
```

Note that at the assembler level, the INTERRUPT register is accessed using the r s r and w s r instructions with special register numbers INTREAD, INTSET and INTCLEAR, which correspond to the functions provided here.

Timers

The HAL indicates whether a given timer is configured and to what interrupt it is tied, through an array of constants:

```
extern const int Xthal_timer_interrupt[4]; // timer interrupt
```

Valid values for each entry in this array are 0 . . . 31 and −1. In the case where a timer is not configured the value is −1. Otherwise, the value is the interrupt to which the timer is tied. Timers are ordered sequentially. So if two timers are configured, they will be represented in entries 0 and 1 of the array.

The HAL provides access to the timer registers through the following routines:

```
extern unsigned xthal_get_ccount ( void );
extern void     xthal_set_ccompare( int n, unsigned int value
extern unsigned xthal_get_ccompare( int n );
```

The xthal_set_ccompare and xthal_get_ccompare functions set and get the value of the CCOMPAREn registers, where n ranges from 0 to 3. Note that when handling a timer interrupt, setting the corresponding CCOMPAREn register clears the interrupt. Setting a non-existent CCOMPARE register has no effect, whereas reading a non-existent CCOMPARE register always returns 0.

Cache

The organization of the caches describes the physical properties and sizes of the caches. The HAL provides access to those properties through the following set of constants:

```
    extern const unsigned char  Xthal_icache_linewidth;    //
size of icache line in bytes log2
    extern const unsigned char  Xthal_dcache_linewidth;    //
size of dcache line in bytes log2
    extern const unsigned char  Xthal_icache_setwidth;     // number
of icache sets log2
    extern const unsigned char  Xthal_dcache_setwidth;     // number
of dcache sets log2
    extern const unsigned int   Xthal_icache_ways;         // icache
set associativity
    extern const unsigned int   Xthal_dcache_ways;         // dcache
set associativity
    extern const unsigned int   Xthal_icache_size;         // size of
the icache in bytes
    extern const unsigned int   Xthal_dcache_size;         // size of
the dcache in bytes
    // Cache attributes supported by the cache.
        extern const unsigned int Xthal_icache_fca_implemented;
// fetch icache attributes
        extern const unsigned int Xthal_dcache_lca_implemented;
// load dcache attributes
        extern const unsigned int Xthal_dcache_sca_implemented;
// store dcache attributes
        // See the XTHAL_CACHEA_xxx constant definitions,
described in the MMU section.
        // Bits set indicate that the corresponding mode is
supported by the cache hardware.
        // The following additional bits indicate support that
cannot be indicated by the
        // other (usual) XTHAL_CACHEA_xxx constants.
    #define XTHAL_CACHEA_HAVE_  0x80000000  // illegal
ILLEGAL                                      attribute
                                             exists
    #define XTHAL_CACHEA_HAVE_  0x40000000  // cause-
MISS                                         MMU-
                                             miss
                                             attribute
                                             exists
    #define XTHAL_CACHEA_HAVE_  0x20000000  // bypass
BYPASS                                       attribute
                                             exists
    #define XTHAL_CACHEA_HAVE_  0x10000000  // isolate
ISOLATE                                      attribute
                                             exists
```

Note that the size constants are provided only for convenience reasons since they can be computed using the other constants.

The HAL provides several global control operations that apply to an entire cache:

```
    void xthal_icache_enable(void);             // enable the
icache
    void xthal_dcache_enable(void);             // enable the
dcache
    void xthal_icache_disable(void);            // disable the
icache
    void xthal_dcache_disable(void);            // disable the
dcache
    unsigned xthal_get_cacheattr(void);         // read
CACHEATTR register
    void     xthal_set_cacheattr(unsigned);     // write
CACHEATTR register
    void xthal_icache_sync(void);               // sync icache
and memory
    void xthal_dcache_sync(void);               // sync dcache
and memory
    void xthal_icache_all_invalidate(void);     // invalidate
the icache
    void xthal_dcache_all_invalidate (void);    // invalidate
the dcache
    void xthal_dcache_all_writeback(void);      // writeback
dcache to memory
    void xthal_dcache_all_writeback_inv(void);  // write
dirty data and invalidate
    void xthal_icache_region_invalidate( void *addr, unsigned
size );
    void xthal_dcache_region_invalidate( void *addr, unsigned
size );
    void xthal_dcache_region_writeback( void *addr, unsigned size
);
    void xthal_dcache_region_writeback_inv( void *addr, unsigned
size );
```

The enable operation enables a cache. Assuming the cache is disabled prior to the call, the enable function invalidates the cache contents and enables the cache (as per default CACHEATTR defined for the core). If the processor is configured so that two caches can only be enabled and disabled together, both caches may be enabled when either xthal_icache_enable( ) or xthal_dcache_enable( ) is called. If the cache is already enabled prior to the call, no action need be taken when CACHEATTR register specifies that the caches have already been enabled; otherwise caches may be invalidated and enabled. Any necessary pipeline synchronization instructions such as RSYNC, MEMW, etc., can be executed during these operations. It also synchronizes the cache and memory, making sure it invalidates the entries when the cache is first enabled.

The disable operation disables a cache. Assuming the cache is enabled prior to the call, the disable function first synchronizes (writes back) the contents of the cache to memory (if the cache is a write-back or write-stream cache), and then disables the cache. Again, for processor configurations where caches can only be enabled and disabled together, both caches may be disabled when either xthal_icache_disable( ) or xthal_dcache_disable( ) is called. If the cache is already disabled prior to the call, no action need be taken when CACHEATTR contains a power-up default value, e.g., 0x22222222; otherwise both caches may be disabled by writing the power up default value to CACHEATTR. Note that this latter operation has the side effect of making any invalid 512 MB regions valid again. This effect comes as a side effect of this value being placed in the CACHEATTR register. In the Xtensa architecture, the CACHEATTR register can have multiple effects, one of which is to declare a 512 Mb section of the address space as invalid. Writing 0x22222222 back to the CACHEATTR will declare all regions as valid again. Any necessary synchronization instructions may be executed during the operations.

The cacheattr operations allow reading and safe writing of the CACHEATTR register, if present. cacheattr differes from other HAL abstractions because of the microarchitectural effect of CACHEATTR. The Xtensa ISA states that it is illegal (or undefined) to change the cache attribute of the 512 MB segment from which instructions are being fetched when writing the CACHEATTR register. However, some processor configurations do allow such operations under certain conditions: the code that sets CACHEATTR must be properly aligned relative to instruction caches, and execute a specific sequence that includes ISYNC and nop's. The xthal_set_cacheattr( ) function takes care of executing the proper sequence so that enabling or disabling the instruction cache of any 512 MB segment is possible safely.

The cacheattr functions are typically called by the above enable and disable operations, and in general do not need to be called elsewhere. Their direct use is discouraged as future implementations of Xtensa might use mechanisms other than a CACHEATTR register to control the caches. In any case, if the CACHEATTR register does not exist, xthal_get_cacheattr returns a value indicating all memory areas are uncached.

The sync operation ensures that any pending cache operation has completed. It does not, for instance, write out the contents of a writeback cache to memory, or invalidate any cache contents. However, it does ensure that any other read or write operations have completed—e.g., write buffers have been written out at least outside the boundaries of the core, cache refills have completed—and that the cache is otherwise in a stable state relative to the core and to the external memory.

The invalidate operation invalidates the contents of the entire cache. This operation may be called when the cache is either enabled or disabled, even though it may be unnecessary to use the call when the cache is disabled since the enable function will invalidate the cache before enabling it). It is unlikely that anyone would want to call xthal_dcache_all_invalidate( ) while the data cache is enabled—if the data cache works in write-back mode [not yet supported], any writes to memory that were cached and not yet written out would be lost. The xthal_dcache_reset( ) and/or xthal_dcache_enable( ) functions internally call xthal_dcache_all_invalidate( ) (or equivalent) to ensure coherency as with icache.

The writeback operation writes back the contents of the data cache to memory. If the cache is not a write-back (or write-stream?) cache, or the cache is not enabled, this function has no effect. Any necessary synchronization instructions are executed during the operation.

The writeback and invalidate operation is equivalent to a writeback operation followed by an invalidate operation. However the combined single operation is faster than invoking the two individual operations separately.

Region control operations apply to an arbitrarily sized contiguous sequence of bytes in memory. Execution time for these functions may be proportional to the number of cache lines covered by that sequence of bytes. So, unreasonably large requests could take a relatively long time to complete.

Regions specified with non-cache-aligned addresses are handled properly. That is, only cache lines containing any of the bytes specified in the region will be affected. The behavior of the routines is undefined if addr+size exceeds the address space of the processor (i.e., when the defined region "wraps around" memory). No cache lines are affected if size is zero; however, synchronization instructions that would be required for a non-zero size may or may not get executed in this case. (Note: the caller should not depend on the synchronization instructions being executed when size is zero.)

```
void xthal_icache_region_invalidate(void *addr,
    unsigned size);
void xthal_dcache_region_invalidate(void *addr,
    unsigned size);
void xthal_dcache_region_writeback(void *addr,
    unsigned size);
void xthal_dcache_region_writeback_inv(void *addr,
    unsigned size);
```

Debug

The Xtensa architecture can provide hardware support for debugging. It is not the intent of the HAL to functionally abstract these features. Rather, the HAL describes the features so that the system software designer can develop a configuration-independent run-time system. The HAL describes three debug-related properties of the processor: (a) whether the debug option has been configured; (b) how many instruction breakpoints exist; and (c) how many data breakpoints exist. The information is provided through three constants defined in the HAL:

```
extern const unsigned int Xthal_debug_configured;     // 0
if not, 1 if so
extern const unsigned int Xthal_num_ibreak;           //
number of ibreak registers
extern const unsigned int Xthal_num_dbreak;           //
number of dbreak registers
```

The HAL provides routines that can be used to assist a debug agent running on a target. The following two functions are used to determine where breakpoints should be set in order to single step a task that is stopped. xthal_inst_type decodes the instruction at a given address. When used with xthal_branch_addr, the debug agent will have enough information to determine the next possible instruction(s) in the task's execution flow. However, these functions do not detect a zero overhead loop since they do not have knowledge of LEND. Within the debug agent, the program counter address of the stopped task should be compared with LEND and if they match, a breakpoint should be set at LBEGIN for a single step.

```
unsigned int xthal_inst_type(void *addr);       // return
instruction type
    #define XTHAL_DEST_REG          0xf0000000   // Mask for
destination register
    #define XTHAL_DEST_REG_INST     0x08000000   // Branch
address is in register
    #define XTHAL_DEST_REL_INST     0x04000000   // Branch
address is relative
    #define XTHAL_RFW_INST          0x00000800
    #define XTHAL_RFUE_INST         0x00000400
    #define XTHAL_RFI_INST          0x00000200
    #define XTHAL_RFE_INST          0x00000100
    #define XTHAL_RET_INST          0x00000080
    #define XTHAL_BREAK_INST        0x00000040
    #define XTHAL_SYSCALL_INST      0x00000020
    #define XTHAL_LOOP_END          0x00000010   // Not set
by xthal_inst_type
    #define XTHAL_JUMP_INST         0x00000008   // Call or jump
instruction
    #define XTHAL_BRANCH_INST       0x00000004   // Branch
```

```
instruction
    #define XTHAL_24_BIT_INST      0x00000002
    #define XTHAL_16_BIT_INST      0x00000001
    unsigned int xthal_branch_addr(void *addr);        // return
relative branch destination
```

The HAL also provides a routine, xthal_get_npc, to determine the next program counter based on a set of register values for a task. This routine takes a pointer to a structure, XTHAL_STATE, that contains the register values for the task. It reads the instruction pointed to by pc, looks at the registers for the task, and returns the pc of the next instruction that will be executed. This routine is useful in target debug agents that need to know the next instruction to set a breakpoint at for single stepping.

```
/* structure that holds the state of a task */
typedef struct xthal_state
{
    unsigned    pc;
    unsigned    ar[16];
    unsigned    lbeg;
    unsigned    lend;
    unsigned    lcount;
    unsigned    extra_ptr;
    unsigned    cpregs_ptr[8];
} XTHAL_STATE;
unsigned int xthal_get_npc(XTHAL_STATE *user_state)    //
return pc of next instruction
```

The following routines are used for setting up software breakpoints. If addition to writing a BREAK instruction in the appropriate place, they synchronize the caches so that an instruction fetch of the BREAK instruction will not contain the previous I-cache value. The set routine returns the instruction that was written over with the breakpoint. It also contains a bit to indicate the size of the instruction. The remove routine requires the address of the breakpoint as well as the word returned by the set routine.

```
    unsigned int xthal_set_soft_break(void *addr);       // set
software breakpoint
    // returns XTHAL_24_BIT_BREAK&0x00xxxxxx for 24 bit
instructions
    // returns XTHAL_16_BIT_BREAK&0x0000xxxx for 16 bit
instructions
    #define XTHAL_24_BIT_BREAK    0x80000000
    #define XTHAL_16 BIT_BREAK    0x40000000
                                  // remove software breakpoint
    unsigned int xthal_remove_soft_break(void *addr, unsigned int
inst);
```

Disassembly

Because the instruction set can change and/or be extended, the following interface abstracts the disassembly of code.

int xthal_disassemble(unsigned char * instr_buf, void *tgt_addr, char *buffer);
  int xthal_disassemble_size(unsigned char *instr_buf);
  Memory Management Unit The Xtensa MMU supports a very wide range of applications by being highly configurable. Such a broad configurability can greatly affect the various functions that support the MMU, e.g., functions for initializing, configuring and doing various operations on the MMU elements, as well as virtual and physical page allocation strategies, page table structures, and so on.

The HAL MMU supports endeavors to hide the complexity implied by such flexibility and configurability, presenting the operating system with a consistent and simpler interface that works for all possible configurations of the Xtensa MMU. In doing so, it provides to the extent possible all of the MMU support that is affected by the variability of the various configuration options of the Xtensa MMU. However, various aspects of MMU support that can be affected by configuration, such as page allocation strategies and assignment of address spaces among various tasks, are integral part of certain operating systems, and cannot appropriately be given up by the operating system to the HAL. In such cases, it is may well be that such an operating system will have some very specific requirements or restrictions on the possible Xtensa MMU configurations to be able to use the Xtensa MMU. Even with such restrictions, there will normally still exist a large number of MMU configuration options available to the system designer to fine-tune the MMU to the particular application (e.g., number of TLB entries, cache attribute mapping, etc.). So, the HAL provides a complete description of the MMU configuration available at run-time so that an operating system that chooses to implement certain parts of the MMU support software itself can retain binary portability to a large degree of MMU configurability.

Although an initial implementation of an MMU such as the Xtensa MMU may only support split TLBs (one for instruction fetches, one for data loads/stores), a future version may support unified TLBs, hence it is preferable to provide an interface which defines all three types of TLBs (Instruction, Data and Unified). This works because the interface should allow for the presence or absence of any given TLB, according to core configuration.

Many functions, constants and other definitions are provided for the three types of TLBs: instruction, data and unified. Where these would result in three identical function or variable names except for a single TLB type character (i, d or u), the function or variable name is shown once with [idu] in place of the TLB type character.

Default Handlers and Vectors

Instruction fetch, data load and data store miss handling is done directly in a dedicated vector for performance reasons. These vectors are executed every time an access is made to a virtual page whose translation is not cached in the relevant TLB. The HAL also provides these vectors for performance reasons. It is an exception to the rule that an operating system always has first level of control for exceptions and interrupts. Note that an operating system could still choose to implement these vectors itself, but by doing so the operating system would either noticeably limit itself in terms of possible Xtensa MMU configurations (which could be mitigated somewhat if the operating system had a number of possible vector implementations and a mechanism to select and load the appropriate vectors based on MMU configuration as indicated by the HAL), or the operating system would take a severe performance hit.

Vectors
  xthal_immu_fetch_miss_vector
  xthal_dmmu_load_miss_vector
  xthal_dmmu_store_miss_vector These vectors call the following operating system-defined functions when they detect a page fault (no entry in the page table for the requested virtual address).

The HAL miss vectors handle successful refills (for a number of table walk options . . . ), but jumps to a user specified handler for failed refills (page faults, protection violations, etc.). Here, it is preferred that separate I-MMU and D-MMU user-specified functions are defined so the unified vector/handler would distinguish before jumping to the correct routine. Note that these functions should be written in assembler, not in C, and are called or jumped to with a specific register convention.

```
typedef void (XtHalMmuFaultFunc) (unsigned vaddr, . . . context . . . );
//   Or,
//       a? = vaddr
//       a? = context . . .
//       PS.xxx = xxx
XtHalMMuFaultFunc *Xthal_immu_fetch_fault_func;
XtHalMMuFaultFunc *Xthal_dmmu_load_fault_func;
XtHalMMuFaultFunc *Xthal_dmmu_store_fault_func;
```

Handlers

The user and/or kernel exception handlers may jump to these handlers to handle the relevant exceptions, according to the value of EXCCAUSE.

When multiple TLB entries match (hit) on the same access:

xthal_immu_fetch_multihit_handler
  xthal_dmmu_load_multihit_handler
  xthal_dmmu_store_multihit_handler Protection violations according to cache attributes, and other cache attribute mismatches:

xthal_immu_fetch_attr_handler
  xthal_dmmu_load_attr_handler
  xthal_dmmu_store_attr_handler Protection violations due to insufficient ring level:

xthal_immu_fetch_priv_handler
  xthal_dmmu_load_priv_handler
  xthal_dmmu_store_priv_handler Alignment exception handlers (if supported by the particular Xtensa MMU configuration):

xthal_dmmu_load_align_handler
  xthal_dmmu_store_align_handler

Alternatively, the operating system user and/or kernel exception handlers may simply jump to the following entry points which will handle any values of EXCCAUSE not handled by the operating system:

xthal_user_exc_default_handler
  xthal_kernel_exc_default_handler

Global Parameters

Global Parameters

```
u8    Xthal_mmu_asid_bits;          // 0 . . . 8
u8    Xthal_mmu_ring_count;         // 1 . . . 4 (perhaps 0 if no
MMU and/or no protection?)
#define XTHAL_MMU_PAGESZ_COUNT_MAX 8    // maximum number of different page sizes
u8    Xthal_mmu_pagesz_count;       // 0 . . . 8   number of
different page sizes configured
    // Note: the following table doesn't necessarily have page
sizes in increasing order:
u8    Xthal_mmu_pagesz_log2[XTHAL_MMU_PAGESZ_COUNT_MAX];
    // 10 . . . 28 (0 past count)
    // Sorted (increasing) table of page sizes, that indexes
into the above table:
u8    Xthal_mmu_pagesz_sorted[XTHAL_MMU_PAGESZ_COUNT_MAX];
    // 0 . . . 7 (0 past count)
u32   Xthal_virtual_exceptions;     // bitmask of which
exceptions execute in virtual mode . . .
u8    Xthal_mmu_pte_pagesz_log2_min;  // ?? minimum
page size in PTEs
u8    Xthal_mmu_pte_pagesz_log2_max;  // ?? maximum
page size in PTEs
Cache Attribute Bits Implemented by the Cache u8    Xthal_icache_fca_bits_implemented;  // ITLB/UTLB only!
u8    Xthal_dcache_lca_bits_implemented;  // DTLB/UTLB
only!
u8    Xthal_dcache_sca_bits_implemented;  // DTLB/UTLB
only!
Per TLB Parameters (Instruction, Data, Unified)

struct XtHalMmuTlb    Xthal_itlb;    // description of
MMU I-TLB generic features
    struct XtHalMmuTlb    Xthal_dtlb;    // description of
MMU D-TLB generic features
    struct XtHalMmuTlb    Xthal_utlb;    // description of
MMU U-TLB generic features
    #define XTHAL_MMU_WAYS_MAX  8    // maximum
number of ways (associativities) for each TLB
    // Structure for common information described for each
possible TLB (instruction, data and unified):
    typedef struct XtHalMmuTlb {
        u8    va_bits;   // 32           (number of virtual
address bits)
        u8    pa_bits;   // 32           (number of physical
address bits)
        bool  tlb_va_indexed;   // 1 (set if TLB is indexed by
virtual address)
        bool  tlb_va_tagged;    // 0 (set if TLB is tagged by
virtual address)
        bool  cache_va_indexed; // 1 (set if cache is indexed
by virtual address)
        bool  cache_va_tagged;  // 0 (set if cache is tagged by
virtual address)
        //bool     (whether page tables are traversed in vaddr
sorted order, paddr sorted order, . . . )
        //u8    (set of available page attribute bits, other than
cache attribute bits defined above)
        //u32   (various masks for pages, MMU table/TLB entries,
etc.)
        u8    way_count;   // 0 . . . 8 (number of ways, a.k.a.
associativities, for this TLB)
        XtHalMmuTlbWay *  ways[XTHAL_MMU_WAYS_MAX]; //
pointers to per-way parms for each way
    } XtHalMmuTlb;
Per TLB Way (Per Associativity) Parameters typedef struct XtHalMmuTlbWay    {
        u32   index_count_log2;    // 0 . . . 4
        u32   pagesz_mask;         // 0 . . . 2^pagesz_count − 1
        (each bit corresponds to a size
                              //     defined in the
```

```
Xthal_mmu_pagesz_log2[] table)
    u32  vpn_const_mask;
    u32  vpn_const_value;
    u64  ppn_const_mask;        // future may support pa_bits > 32
    u64  ppn_const_value;
    u32  ppn_id_mask;           // paddr bits taken directly from vaddr
    bool backgnd_match;         // 0 or 1
    //   These are defined in terms of the XTHAL_CACHE_xxx bits:
    u8   fca_const_mask;        // ITLB/UTLB only!
    u8   fca_const_value;       // ITLB/UTLB only!
    u8   lca_const_mask;        // DTLB/UTLB only!
    u8   lca_const_value;       // DTLB/UTLB only!
    u8   sca_const_mask;        // DTLB/UTLB only!
    u8   sca_const_value;       // DTLB/UTLB only!
    //   These define an encoding that map 5 bits in TLB and PTE entries to
    //   8 bits (FCA, ITLB), 16 bits (LCA+SCA, DTLB) or 24 bits (FCA+LCA+SCA, UTLB) :
    //   (they may be moved to struct XtHalMmuTlb)
    u8   ca_bits;               // number of bits in TLB/PTE entries for cache attributes
    u32 * ca_map;               // pointer to array of 2^ca_bits entries of FCA+LCA+SCA bits
} XtHalMmuTlbWay;
```

Possible FCA, LCA and SCA (fetch, load and store cache attribute) values are represented as an 8-bit integer organized as follows. Note that not all possible combinations of these bits make sense. Also, certain bit combinations are reserved.

```
// Bits:
//#define XTHAL_CACHEA_PIF_AM      0x80  // (access modifier bit(s) driven on PIF)
//#define XTHAL_CACHEA_UNORDERED   0x40  // (set if memory accesses can be made out of order)
#define XTHAL_CACHEA_SPECIAL      0x20  // (set for special values, listed below)
#define XTHAL_CACHEA_WRITEBACK    0x10  // may write to cache without always writing to PIF (store only)
#define XTHAL_CACHEA_COHERENT     0x08  // on PIF reads, other processors may need to supply the data
#define XTHAL_CACHEA_PREFETCH     0x04  // on refill, read line+1 into prefetch buffers . . .
#define XTHAL_CACHEA_ALLOCATE     0x02  // refill cache on miss
#define XTHAL_CACHEA_STREAM       0x01  // access one of N stream buffers
//  Values:
#define XTHAL_CACHEA_ILLEGAL      0x20  // always take exception
#define XTHAL_CACHEA_BYPASS       0x21  // ignore cache contents; go straight to PIF
#define XTHAL_CACHEA_ISOLATE      0x22  // access (read or write) cache contents regardless of tag compare
// other combinations with XTHAL_CACHEA_SPECIAL bit set are reserved
```

The way to determine whether protection support is present in core is to look at Xthal_mmu_ring_count.

MMU Control

```
int  xthal_mmu_init( void );    // initialize all TLBs with identity or other default mapping
void xthal_[idu]mmu_all_enable( void );
void xthal_[idu]mmu_all_disable( void );
void xthal_[idu]mmu_way_enable( unsigned way );
void xthal_[idu]mmu_way_disable( unsigned way );
void xthal_[idu]mmu_way_config( unsigned way, unsigned pagesz_index, bool autorefill );
void xthal_[idu]mmu_srcheck_enable( void );
void xthal_[idu]mmu_srcheck_disable( void );
```

Register Access Functions

```
u32  xthal_get_mmu_cfg( void );
u32  xthal_set_mmu_cfg( u32 value );
u32  xthal_get_excvaddr( void );
//u32 xthal_set_excvaddr( u32 value );  // (may not be possible depending on h/w implementation)
u32  xthal_get_pagetable( void );.;     // note: lower bits taken from upper bits of EXCVADDR
u32  xthal_set_pagetable( u32 value );  // note: writes entire PAGETABLE
u32  xthal_get_[idu]tlb_cfg( void );
u32  xthal_set_[idu]tlb_cfg( u32 value );
u32  xthal_get_rasid( void );
u32  xthal_set_rasid( u32 value );
```

TLB Invalidation

The following functions are provided to invalidate TLB entries. Note that more entries may get invalidated than what is requested if the hardware does not provide a mechanism to invalidate (with reasonable performance, at least relative to what it would take to refill the extra invalidated entries) exactly what was requested.

```
void xthal_[idu]tlb_page_invalidate(u32 vaddr);
void xthal_[idu]tlb_region_invalidate(u32 vaddr, u32 size);
void xthal_[idu]tlb_index_invalidate(u32 indexway);
void xthal_[idu]tlb_all_invalidate(void);

void xthal_[idu]tlb_aspage_invalidate(u32 asid, u32 vaddr);
void xthal_[idu]tlb_asregion_invalidate(u32 asid, u32 vaddr, u32 size);
void xthal_[idu]tlb_asindex_invalidate(u32 asid, u32 indexway);
void xthal_[idu]tlb_asall_invalidate( u32 asid);
```

TLB Access

```
// These use the current RASID and encoded PTE format:
void xthal_[idu]tlb_set_entry( u32 indexway, u32 pte );
void xthal_[idu]tlb_autofill_entry( u32 pte );
// These are given explicit fields, thus more easily portable, but less efficient:
void xthal_[idu]tlb_set_mapping( u32 indexway, u32 paddr, u32 vaddr, u32 sizesr, u32 cattr, u32 asid );
void xthal_[idu]tlb_autofill_mapping(u32 paddr, u32 vaddr, u32 sizesr, u32 cattr, u32 asid );
void xthal_[idu]tlb_get_entry( u32 indexway, u32 *paddr, u32 *vaddr, u32 *sizesr, u32 *cattr, u32 *asid );
```

Physical Page Allocation

This is an optional/supplemental subset of the HAL; the operating system is free to implement its own physical page allocation scheme and ignore these functions.

Initially, no physical pages are available for allocation using xthal_mmu_palloc( ). The operating system can call xthal_mmu_pavailable( ) to provide the HAL with physical pages available for allocation, and later to return to the HAL physical pages obtained via xthal_mmu_palloc( ).

These functions optimize their behavior according to the set of page sizes configured for the MMU.

```
void xthal_mmu_pinit(void);
int xthal_mmu_palloc(u32 paddr, u32 size, u32 attr_
    opts, u32 *ppaddr);
int xthal_mmu_pavailable(u32 paddr, u32 size, u32
    attr_opts);
```

Virtual Page Allocation

These functions may be used to allocate virtual memory from an address space, e.g., for the kernel, a task, a set of tasks, etc. Various operating systems do their own such allocation (virtual and/or physical), but their ports to Xtensa may consider using these functions to assist in the allocation, because these functions are optimized according to the options (page sizes, attributes, etc.) configured for the MMU. In fact, it's likely that only operating systems that have no native MMU support will not have such page-based allocation support (e.g., Nucleus, etc.).

These definitions encapsulate the page table structure. Should the page table be handled by HAL, or by operating system? The wide possible variety of MMU architectures dictate HAL should do it, however operating system-specific optimizations may require the operating system to do at least some of it. For example, some operating systems do simplified context switches by changing single TLB entries rather than entire contexts; or do other optimizations for semi-process threads that only have read-only pages unique to them, but share everything else from a common process (e.g., share the same ASID with some invalidates done every context switch, or perhaps use an extra ring instead).

```
// Structure that describes an address space.
    typedef struct XtHalMmuAs {
        u32    asid;           // address space id (ASID) and its
generation count for this AS
                               // (see ASID allocation strategy . . . )
    // Page table for this address space:
    // . . .
    // Virtual address allocation info
    // . . . (private to HAL) . . .
    } XtHalMmuAs;
    void    xthal_mmu_vinit( XtHalMmuAs *pas );
    int     xthal_mmu_valloc( XtHalMmuAs *pas, u32 vaddr, u32 size,
u32 attr_opts, u32 *pvaddr );
    int     xthal_mmu_vavailable( XtHalMmuAs *pas, u32 vaddr, u32
size, u32 attr_opts );
    int     xthal_mmu_vmap( XtHalMmuAs *pas, u32 vaddr,
u32 paddr, u32 size, u32 attr_opts );
    // . . . also provide access to any undefined/OS-reserved bits of
MMU table entries (in memory) . . .
    // Some of the possible attr_opts:
    #define XTHAL_MMU_AO_ALLOCDOWN  0x01000000  // set
to allocate from end of memory
    #define XTHAL_MMU_AO_FCA_MASK   0x00FF0000  // i-
fetch cache attributes
    #define XTHAL_MMU_AO_LCA_MASK   0x0000FF00  //
load cache attributes
    #define XTHAL_MMU_AO_SCA_MASK   0x000000FF  //
store cache attributes
    // . . .
    // Structure used tb scan mappings of an address space.
    typedef struct XtHalMmuAsScan {
        u32    vaddr;
        u32    paddr;
        u8     sizesr;
        u8     fca;
        u8     lca;
        u8     sca;
        //u8   ringlevel;
```

-continued

```
    // Scanning state (private to HAL):
    XtHalMmuAs *     pas;
    // . . .
    } XtHalMmuAsScan;
    //      Function to traverse all virtual->physical mappings for
an address space, optimally:
    int     xthal_mmu_vgetnext_mapping( XtHalMmuAsScan
*pscan );
    //      Function to inquire about a given virtual address'
mapping:
    int     xthal mmu_vget_mapping( XtHalMmuAsScan *pmapping );
    //      Functions provided by OS, to allocate/free physical pages
for page tables:
    int     (*Xthal_mmu_palloc_func) ( u32 paddr, u32 size, u32
attr_opts, u32 *ppaddr );
    int     (*Xthal_mmu_pavailable_func) ( u32 paddr, u32 size, u32
attr_opts );
```

Non-Windowed Entry Points

Non-windowed entry points are provided for most or all of the above MMU functions. They are functions with the same name except that a "_nw" suffix is appended.

Multiprocessor Support

The core ISA includes four instructions for pipeline synchronization (ISYNC, RSYNC, ESYNC, DSYNC). However, when multiple processors are used in a system, some sort of communication and synchronization between processors is required. In some cases self-synchronizing synchronizing communication, such as input and output queues, or other specialized external communication hardware are used. In other cases, a shared memory model is used for communication, and it is necessary to provide instruction-set support for synchronization because shared memory does not provide the required semantics. The Multiprocessor Synchronization Option is designed for this shared memory case.

The HAL provides an abstraction of this core configuration option so that the operations it provides can be executed whether or not the option is present. When the multiprocessor option is not configured, an equivalent operation is implemented that works correctly on a single processor.

Other core configuration options may be added in the future in support of multiprocessor operation (e.g., new registers or instructions for fast and/or prioritized message queuing, other types of multiprocessor synchronization primitives, multiprocessor shared resources, etc.). Such options will also be abstracted by the HAL.

Compare And Swap

The xthal_compare_swap( ) function does an atomic compare and swap on an aligned 32-bit memory word. The memory word at address *ptr is read and compared with from; if it matches, the value to is then written to *ptr. In any case, the value read from *ptr is returned by the function. The entire operation is atomic across multiple processors that share access to the memory word (or at least, across the subset of these processors that implement the necessary hardware protocol to support atomicity of this instruction).

This function is implemented using the S32C1I instruction when the multiprocessor option is configured. See the Xtensa ISA documentation for more details on this instruction and its possible uses. If the instruction isn't available, the equivalent is done with ordinary instructions but with interrupts disabled such that the operation is at least atomic on the invoking processor.

```
extern unsigned xthal_compare_swap(unsigned *ptr,
    unsigned from, unsigned to);
``` extern unsigned xthal_compare_swap_nw(unsigned
   *ptr, unsigned from, unsigned to);

The following variable can be used to determine whether or not the multiprocessor compare and swap instruction is actually present in the core. This might allow an operating system to conditionally branch to a different version of the code that uses this instruction directly, for highly optimized operating system primitives and operations that require it.

extern bool Xthal_s32cli_configured;

Generation of the HAL

As noted above, in addition to the HAL itself, another advantageous aspect of the present invention is its ability to generate the HAL directly from a configurable processor specification. To do this, a user begins by selecting a base processor configuration via the GUI described in the previous applications. The user also can select which RTOS will be used in the system, and the system later will check the resultant configuration against the operating system.

Figure 3:
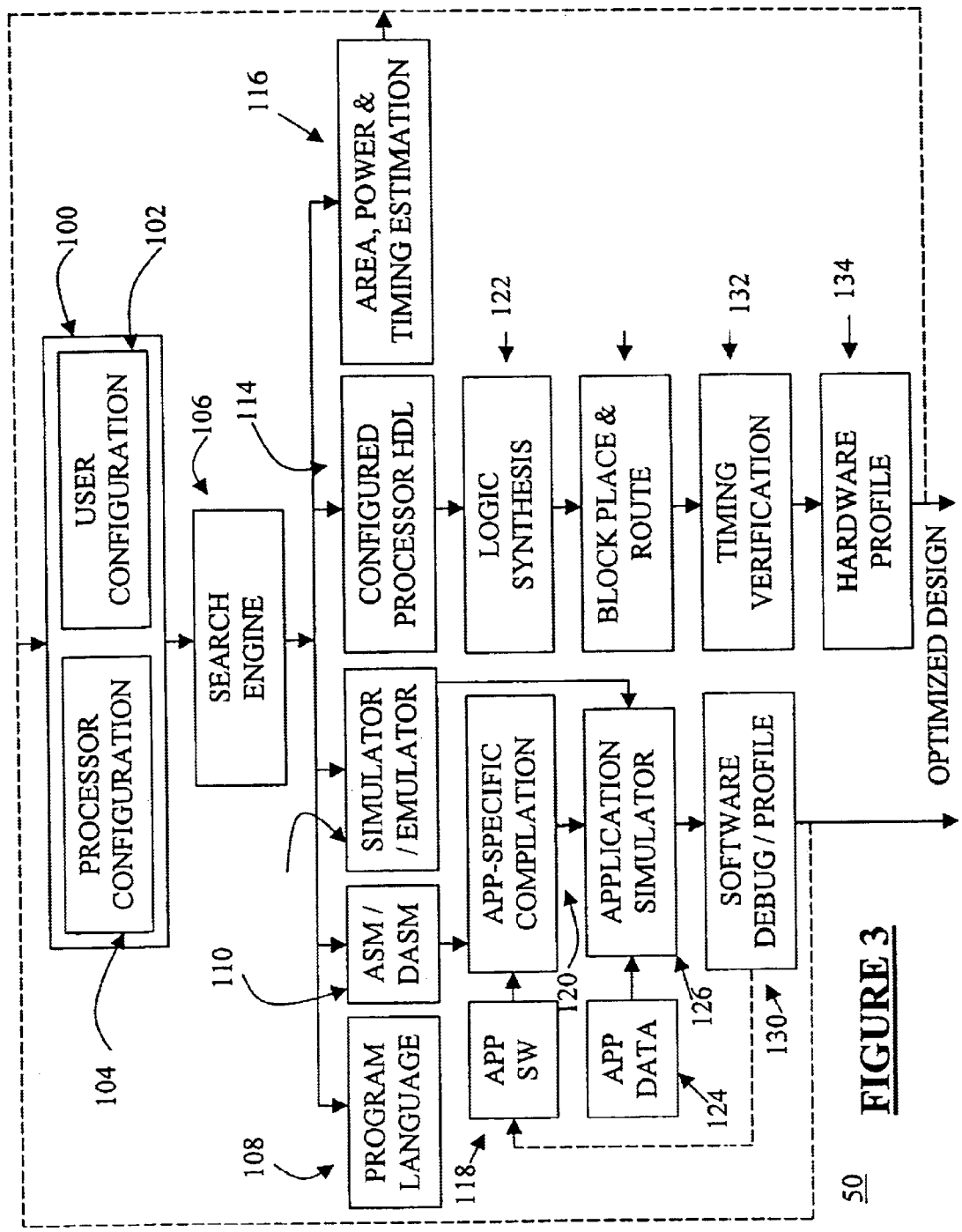
FIG. 3 shows the flow of processor configuration according to the preferred embodiment.

A software development system 30 is built and delivered to the user as shown in FIG. 1. The software development system 30 contains four key components relevant to the current invention, shown in greater detail in FIG. 3: a compiler 108, an assembler 110, an instruction set simulator 112, a debugger 130, the HAL and various operating system overlays.

Real-time operating systems can be distributed in a variety of different forms. Some operating systems are distributed in binary or object form while others are distributed either in source form or some other form allowing for recompilation of the operating system on a configuration by configuration basis. The HAL, as previously described, is a mechanism whereby object code distributed operating systems can be made to run with full features on a configurable processor.

While the HAL is designed to be lightweight, there is a run-time efficiency penalty associated with use of the HAL. So, use of the HAL for operating systems whose business or other arrangements require maximum efficiency for each configuration is a more complex decision. Use of the HAL may increase maintainability and quality, but it does have those run-time efficiency penalties.

In any event, for operating systems that can be recompiled for each configuration it is still necessary to configure the operating system for that configuration. It is simply the case that that configuration mechanism may not be the HAL. This configuration takes the form of configuring various source, header files and date files for a particular configuration.

A good example of this is the aforementioned Nucleus PLUS operating system. The Nucleus operating system is sold by its manufacturer, Accelerated Technology, Incorporated, in source form. Because it is distributed in source form, it can be recompiled for each configuration. Though the port of this OS to Xtensa uses the HAL, it also requires that the files comprising the architecture layer of Nucleus be modified on a per-configuration basis.

Operating systems are often tied closely to a set of software tools that run on the workstation. The purpose of these software tools is to aid the software development process. These tools can also need to be configured on a per configuration basis. These tools can need information of all the aspects of the configuration just like the operating system needs the configuration information.

An example of this is the host side tools of the Tornado tool suite from Wind River Systems. These files use a variety of TCL scripts to set and query various aspects of the processor so these tools can be used to browse and edit register values on the processor.

The operating system-specific files (either for use by or building host tools or the operating system itself) that need to be generated are called the operating system overlay (OSO). Note that each operating system overlay is specific to a particular operating system and tool environment.

So, as an example, those files to configure Nucleus PLUS for an Xtensa configuration are part of the operating system overlay for Nucleus PLUS. In the same way, the files configure the Tornado host tools for a configuration are part of the operating system overlay for Tornado.

Board support packages (BSPs) are software libraries used in an RTOS to provide software support for particular boards. Creation of BSPs often requires a significant amount of development. BSPs depend on the processor and on the configuration of the processor. In the preferred embodiment, BSPs for supported platforms are automatically generated by the processor generator for a particular configuration.

In the preferred embodiment, each OSO is generated automatically by the processor generator based upon the user's configuration.

The HAL, as previously described, is a processor-centric abstraction. Based upon that previous description, it is clear that the HAL must be aware of almost all of the configurable aspects of the processor. In particular, it must be aware of additional state, additional coprocessors, the interrupt structure, timers, cache configuration, debug configuration and extension of the opcode space for purposes of debugging.

In the preferred embodiment, the HAL is generated automatically by the processor generator based upon the user's configuration. That configuration drives the production of the source code of the HAL which in turn is compiled for the particular configuration.

Use of the HAL:

Once the HAL is in place, the port of the operating system makes calls into the HAL. The operating itself is compiled to the base ISA for a particular ABI, so the OS code will execute on all configurations of that particular ABI.

The OS has an architecture layer that is operating system-specific. The HAL provides a interface to abstract configuration-specific parameters. Consider then, the following examples of code that use the HAL to implement architecture layer functions.

The following function handles a timer interrupt:

```
entry     sp, 16
movi a6, 0
movi a4, xthal_get_ccompare
callx4    a4              // read ccompare0
movi a2, CLOCK_PERIOD
add       a7, a2, a6      // pass ccompare0 + CLOCK_PERIOD
movi a6, 0                // pass 0 for timer 0
movi a4, xthal_set_ccompare
callx4    a4
```

Note that in this section of code, the HAL is abstracting the timer arrangement for the operating system. But the rest of the code is very operating system-specific and, as a consequence, should not need to change on a per-configuration basis.

```
    movi a3, System_Clock
    l32i a2, a3, 0      // load System_Clock
    movi a4, Timer_State
    l32i a5, a4, 0      // load Timer_State
    addi a2, a2, 1      // System_Clock++
    s32i a2, a3, 0      // save System_Clock
    /* Determine if the count-down timer is active.   */
/
    bnez a5, _No_Timer_Exp    // TM_ACTIVE = 0
        /* Decrement the count-down timer.   */
    movi a3, Timer
    l32i a2, a3, 0      // load Timer
    movi a5, 2          // load TM_EXPIRED
    addi a2, a2, -1     // Timer--
    s32i a2, a3, 0      // save Timer
        /* Determine if the timer has expired. If so, modify the
state to indicate that it has expired.   */
    bnez a2, _TMT_No_Timer_Exp
    s32i a5, a4, 0      // Timer_State = TM_EXPIRED.
_No_Timer_Exp:
    /* Determine if the time-slice timer is active. Note that
the parameters for the time-slice are controlled by the OS.*/
    movi a3, Time_Slice_State
    l32i a2, a3, 0      // load Time_Slice_State
    bnez a2, _No_TS_Exp
        /* Decrement the time slice counter.   */
    movi a4, Time_Slice
    l32i a5, a4, 0      // load Time_Slice
    movi a2, 2          // load TM_EXPIRED
    addi a5, a5, -1     // Time_Slice--
    s32i a5, a4, 0      // save Time_Slice
        /* Determine if the time-slice timer has expired. If so,
modify the time-slice state to indicate that it has.   */
    bnez a5, No_TS_Exp
    s32i a2, a3, 0      // Time_Slice_State = TM_EXPIRED
        /* Copy the current thread into the time-slice task pointer.
*/
    movi a3, Current_Thread
    l32i a3, a3, 0      // load Current_Thread
    movi a4, Time_Slice_Task
    s32i a3, a4, 0      // save Time_Slice_Task
    movi a2, 1
    s32i a2, a3, 32
_No_TS_Exp:
    /* Determine if either of the basic timers have expired.*/
    movi a3, Timer_State
    l32i a3, a3, 0      // load Timer_State
    movi a4, Time_Slice_State
    l32i a4, a4, 0      // load Time_Slice_State
    beqi a3, 2, _Expiration
    bnei a4, 2, _No_Expiration
_Expiration:
    movi a6, TMD_HISR
    movi a4, Activate_HISR
    callx4     a4
    // }
    No_Expiration:
```

Note that the rest of the code "in the architecture layer" is not actually configuration-specific.

Here is another example of use of the HAL:

```
Build_Task_Stack:
    entry      sp, 48
    /* Pickup the stack size.   */
    l32i a4, a2, STACK_SIZE
    /* Pickup the stack base.   */
    l32i a3, a2, STACK_START
    /* Calculate the stack ending address.   */
    srli a4, a4, 2
    slli a4, a4, 2     // align stack
    addi a4, a4, -4
    // Task_Stack_Ptr(a3) = Stack_Base + Stack_Size - 4;
    add        a3, a3, a4
```

Note in the following the use of the HAL to determine the size of the save area required for the coprocessor state.

```
    // Create some space for pointers to coprocessor save area.
    movi a5, Xthal_num_coprocessors
    l32i a5, a5, 0
    slli a5, a5, 2
    movi a6, Xthal_cpregs_size
    mov        a8, sp
    add        a9, a6, a5
_Task_Set_Coproc_Space_Loop:
    l32i a7, a6, 0
    addi a6, a6, 4
    sub        a3, a3, a7
    s32i a3, a8, 0
    addi a8, a8, 4
    blt        a6, a9, _Task_Set_Coproc_Space_Loop
    sub        a3, a3, a5
    mov        a6, sp
    add        a7, a6, a5
    mov        a5, a3
_Task_Set_Coproc_Ptr_Loop:
    l32i a8, a6, 0
    addi a6, a6, 4
    s32i a8, a5, 0
    addi a5, a5, 4
    blt        a6, a7, _Task_Set_Coproc_Ptr_Loop
    /* Save the stack ending address.   */
    s32i a3, a2, STACK_END
    /* Build an initial stack.   */
    movi a5, TASK_STACK+16
    sub        a7, a3, a5
    movi a6, 1
    s32i a6, a7, 0
    movi a6, Task_Shell
    s32i a6, a7, XT_TASK_PC
    movi a6, 0x50020
    s32i a6, a7, XT_TASK_PS
    movi a6, 0
    s32i a6, a7, XT_TASK_A0
    s32i a3, a7, XT_TASK_A1
    s32i a6, a7, XT_TASK_A2
    s32i a6, a7, XT_TASK_A3
    s32i a6, a7, XT_TASK_A4
    s32i a6, a7, XT_TASK_A5
    s32i a6, a7, XT_TASK_A6
    s32i a6, a7, XT_TASK_A7
    s32i a6, a7, XT_TASK_A8
    s32i a6, a7, XT_TASK_A9
    s32i a6, a7, XT_TASK_A10
    s32i a6, a7, XT_TASK_A11
    s32i a6, a7, XT_TASK_A12
    s32i a6, a7, XT_TASK_A13
    s32i a6, a7, XT_TASK_A14
    s32i a6, a7, XT_TASK_A15
    s32i a6, a7, XT_TASK_LBEG
    s32i a6, a7, XT_TASK_LEND
    s32i a6, a7, XT_TASK_LCOUNT
    s32i a6, a7, XT_TASK_SAR
    /* Save the minimum amount of remaining stack memory.   */
    l32i a4, a2, STACK_START
    sub        a4, a7, a4    // Stack_End - Stack_Start
    s32i a4, a2, STACK_MIN
    /* Save the new stack pointer into the task's control block.
*/
    s32i a7, a2, STACK_PTR
    retw
```

Again note that there is much of this code that is not configuration-specific, but is instead operating system-specific or core ISA-specific. The HAL removes all of this from the architecture layer and places it behind a veneer so that the OS will work for all configurations.

Preferred embodiments of the present invention have been described herein; however, these are merely illustrative and the present invention should not be taken as being so limited. In fact, those of ordinary skill in the art will readily see that variations on the above embodiment are readily apparent.

For example, in a sense the preferred embodiment of the HAL primarily addresses binary portability, and the HAL may be extended to meet the needs of source-available RTOSes. The basic issue is one of how the interface is expressed. The above discussion of the preferred embodiment describes a programmatic interface that ends up being expressed as certain entry points that perform certain tasks and addresses that contain certain information. This information is present at run time.

This is useful when an operating system is pre-built and needs to be configured for a particular processor. Since at the time of building the operating system had no idea what the information would be, it simply depends on the interface.

On the other hand, it is possible to provide a C level interface that aids development of operating systems that will be configured at build time. Here's a simple example:
Current HAL:

hal file hal.c.tpp
. . .
int xthal_highest_interrupt='$pr→number_of_interrupts'
. . .

This file is built for the configuration and sets xthal_highest_interrupt to the number of interrupts.
hal file hal.h
. . .
extern int xthal_highest_interrupt
. . .

This file simply declares that as available.
OS file interrupts.c
include "hal.h"
. . .
for (i=0; i<xthal_highest_interrupt; i++)
. . .

This file actually uses the value. Note that in the final executable there will be space allocated for the xthal_highest_interrupt value and that this value will be stored there. Also note that the loop above will load that value from memory. The value will not be hard coded. So, the assembly will be something like this:

132r a2, address_of_xthal_highest interrupt
132i a2, a2, 0
(a2 now has the number of interrupts)

So, if the object code of interrupts.c is linked against a HAL built for a configuration with two interrupts, then it gets the right value. If it gets build with a HAL for a configuration with four interrupts it gets the right value.

The extension of the HAL will not have a hal.c in this case. It will only have a hal.h and that will look like this:

hal file hal.h
. . .
define XTHAL_HIGHEST_INTERRUPT
. . .

OS file interrupts.c will look like:

include "hal.h"
. . .
for (i =0; i<XTHAL_HIGHEST_INTERRUPT; i++)
. . .

In this case, the constant will be hardcoded by the compiler into the object. So the code will look something like:

movi a2, XTHAL_HIGHEST_INTERRUPT
(a2 now has the number of interrupts)

Thus, one can see that this variation on the invention provides a convenient way of expressing the effects of configuration in C.

The present invention has been described above in connection with a preferred embodiment thereof; however, this has been done for purposes of illustration only, and the invention is not so limited. Indeed, variations of the invention will be readily apparent to those skilled in the art and also fall within the scope of the invention.

What is claimed is:

1. A method for allowing a desired operating system to be executed on different configurations of a base configurable processor comprising:

automatically providing a common software interface to a plurality of different operating systems, including the desired operating system; and automatically providing an abstraction layer that abstracts areas of the processor configurability, such that a first software implementation of the interface and abstraction layer build is executable together with the desired operating system on a first configuration of the base configurable processor, and a second software implementation of the interface and abstraction layer build is executable together with the desired operating system on a second different configuration of the base configurable processor.

2. A software library as in claim 1, wherein the areas of processor configurability include save and restore of configurable processor state.

3. A software library as in claim 1, wherein the areas of processor configurability include co-processor initialization and control.

4. A software library as in claim 1, wherein the areas of processor configurability include interrupts.

5. A software library as in claim 1, wherein the areas of processor configurability include timers.

6. A software library as in claim 1, wherein the areas of processor configurability include processor instruction caches.

7. A software library as in claim 1, wherein the areas of processor configurability include processor data caches.

8. A software library as in claim 1, wherein the areas of processor configurability include processor debug features.

9. A method as in claim 1, wherein the areas of processor configurability include instruction stream disassembly.

10. A system for generating software for execution on a configurable processor, comprising:

an interface that receives a configurable processor description, including a first configuration of the configurable processor and a second different configuration of the configurable processor; and a build system that receives the first and second configurations and automatically generates a software implementation having an abstraction layer that abstracts configurable portions of the configurable processor, such that a first build of the software implementation is executable on the first configuration of the configurable processor and a second build of the software implementation is executable on the second configuration of the configurable processor.

11. A method as in claim 1, wherein the abstraction layer is operating system independent.

12. A system as in claim 10, wherein the abstraction layer is operating system independent.

13. A method of porting a desired operating system to different configurations of a base configurable processor comprising:

provided a common software interface to a plurality of different operating systems, including the desired operating system;

receiving a first configuration of the base configurable processor;

automatically generating a first abstraction layer based on the first configuration;

building a first software implementation using the common software interface and the first abstraction layer, the first software implementation being executable together with the desired operating system on the first configuration of the base configurable processor;

receiving a second configuration of the base configurable processor, the second configuration being different than the first configuration; and automatically generating a second abstraction layer based on the first configuration;

building a second software implementation using the common software interface and the second abstraction layer, the second software implementation being executable together with the desired operating system on the second configuration of the base configurable processor.

14. A method as in claim 13, wherein the first and second configurations include parameters for processor configurability, the parameters including two or more of save and restore of configurable processor state, co-processor initialization and control, interrupts, timers, instruction caches, processor data caches, processor debug features, and instruction stream disassembly.

15. A method of designing a configurable processor, the configurable processor having a first instruction set architecture portion that is not configurable and a second instruction set architecture portion that is user-configurable, the configurable processor being able to execute software intended for a desired operating system, the method comprising:

automatically providing a common software interface to a plurality of different operating systems, including the desired operating system;

receiving a desired configuration for the configurable processor, the desired configuration specifying parameters for configuration of the second instruction set architecture portion of the configurable processor, the parameters including two or more of save and restore of configurable processor state, co-processor initialization and control, interrupts, timers, instruction caches, processor data caches, processor debug features, and instruction stream disassembly;

automatically generating an abstraction layer based on the received configuration; and building a software implementation using the common software interface and the abstraction layer, the software implementation being executable together with the desired operating system on the configurable processor.

16. A system for designing a configurable processor, the configurable processor having a first instruction set architecture portion that is not configurable and a second instruction set architecture portion that is user-configurable, the configurable processor being able to execute software intended for a desired operating system, the system comprising:

a common software interface to a plurality of different operating systems, including the desired operating system;

a user interface for receiving a desired configuration for the configurable processor, the desired configuration specifying parameters for configuration of the second instruction set architecture portion of the configurable processor, the parameters including two or more of save and restore of configurable processor state, co-processor initialization and control, interrupts, timers, instruction caches, processor data caches, processor debug features, and instruction stream disassembly;

means for automatically generating an abstraction layer based on the received configuration; and means for building a implementation using the common software interface and the abstraction layer, the software implementation being executable together with the desired operating system on the configurable processor.

* * * * *